(12) United States Patent
Ahmed et al.

(10) Patent No.: US 9,405,501 B2
(45) Date of Patent: Aug. 2, 2016

(54) SYSTEM AND METHOD FOR AUTOMATIC SYNCHRONIZATION OF AUDIO LAYERS

(71) Applicant: SongAlbum, LLC, Seattle, WA (US)

(72) Inventors: ZeeShan Ahmed, Karachi (PK); Danish Lakhani, Karachi (PK)

(73) Assignee: SongAlbum, LLC, Seattle, WA (US)

( * ) Notice: Subject to any disclaimer, the term of this patent is extended or adjusted under 35 U.S.C. 154(b) by 0 days.

(21) Appl. No.: 14/404,293

(22) PCT Filed: May 30, 2013

(86) PCT No.: PCT/US2013/043397
§ 371 (c)(1),
(2) Date: Nov. 26, 2014

(87) PCT Pub. No.: WO2013/181414
PCT Pub. Date: Dec. 5, 2013

(65) Prior Publication Data
US 2015/0193194 A1    Jul. 9, 2015

Related U.S. Application Data

(60) Provisional application No. 61/672,107, filed on Jul. 16, 2012.

(30) Foreign Application Priority Data

Jun. 1, 2012  (PK) .................................. 345/2012

(51) Int. Cl.
*G06F 17/00*   (2006.01)
*G06F 3/16*    (2006.01)
(Continued)

(52) U.S. Cl.
CPC .......... *G06F 3/165* (2013.01); *G11B 20/10527* (2013.01); *G11B 27/10* (2013.01); *G10H 2240/325* (2013.01); *G11B 2020/10546* (2013.01)

(58) Field of Classification Search
CPC .... G11B 27/005; G11B 27/031; G10H 1/025; G10H 2220/081; G10H 2240/016; G10H 2240/325; H10H 2210/125; H10H 2210/391; H04N 21/234327; H04N 5/265
See application file for complete search history.

(56) References Cited

U.S. PATENT DOCUMENTS 7,705,230 B2    4/2010  Bowen
8,488,943 B1 *  7/2013  Sharifi ................. H04N 9/8211
                                                 386/278
(Continued)

FOREIGN PATENT DOCUMENTS

KR    10-2007-0099501 A    10/2007

OTHER PUBLICATIONS

International Search Report mailed Aug. 28, 2013 in PCT Application No. PCT/US2013/043397 (4 pages).

(Continued)

*Primary Examiner* — Andrew C Flanders
(74) *Attorney, Agent, or Firm* — Shabbi S. Khan; Christopher J. McKenna; Foley & Lardner LLP

(57) ABSTRACT

Methods and systems for synchronizing audio layers is disclosed. In one aspect, a method of synchronizing audio layers to form an audio composition includes receiving, from a first computing device, at an audio synchronization system, a first audio layer having a first length. The audio synchronization system identifies a portion of a second audio layer with which the received first audio layer is to be synchronized. The audio synchronization system adjusts the first length to match a second length of the identified portion of the second audio layer by altering the tempo of the first audio layer. The audio synchronization system trims a recording signal delay from a beginning portion of the first audio layer and combines the first audio layer and the second audio layer to form an audio composition. In some implementations, the second audio layer includes a reference audio layer.

20 Claims, 20 Drawing Sheets

(51) Int. Cl.
*G11B 27/10* (2006.01)
*G11B 20/10* (2006.01)

(56) References Cited

U.S. PATENT DOCUMENTS

| | | | |
|---|---|---|---|
| 9,111,519 B1* | 8/2015 | Yang | G10H 1/40 |
| 2008/0041220 A1* | 2/2008 | Foust | G11B 27/031 |
| | | | 84/625 |
| 2009/0019995 A1* | 1/2009 | Miyajima | G10H 1/0025 |
| | | | 84/625 |
| 2009/0044689 A1* | 2/2009 | Komori | G10H 1/0025 |
| | | | 84/625 |
| 2009/0116668 A1 | 5/2009 | Davidson | |
| 2009/0263100 A1* | 10/2009 | Neuman | G11B 27/005 |
| | | | 386/241 |
| 2011/0252944 A1 | 10/2011 | Humphrey | |
| 2011/0294577 A1 | 12/2011 | Ryu | |

OTHER PUBLICATIONS

International Preliminary Report on Patentability and Written Opinion for Application No. PCT/US2013/043397 dated Dec. 11, 2014.

* cited by examiner

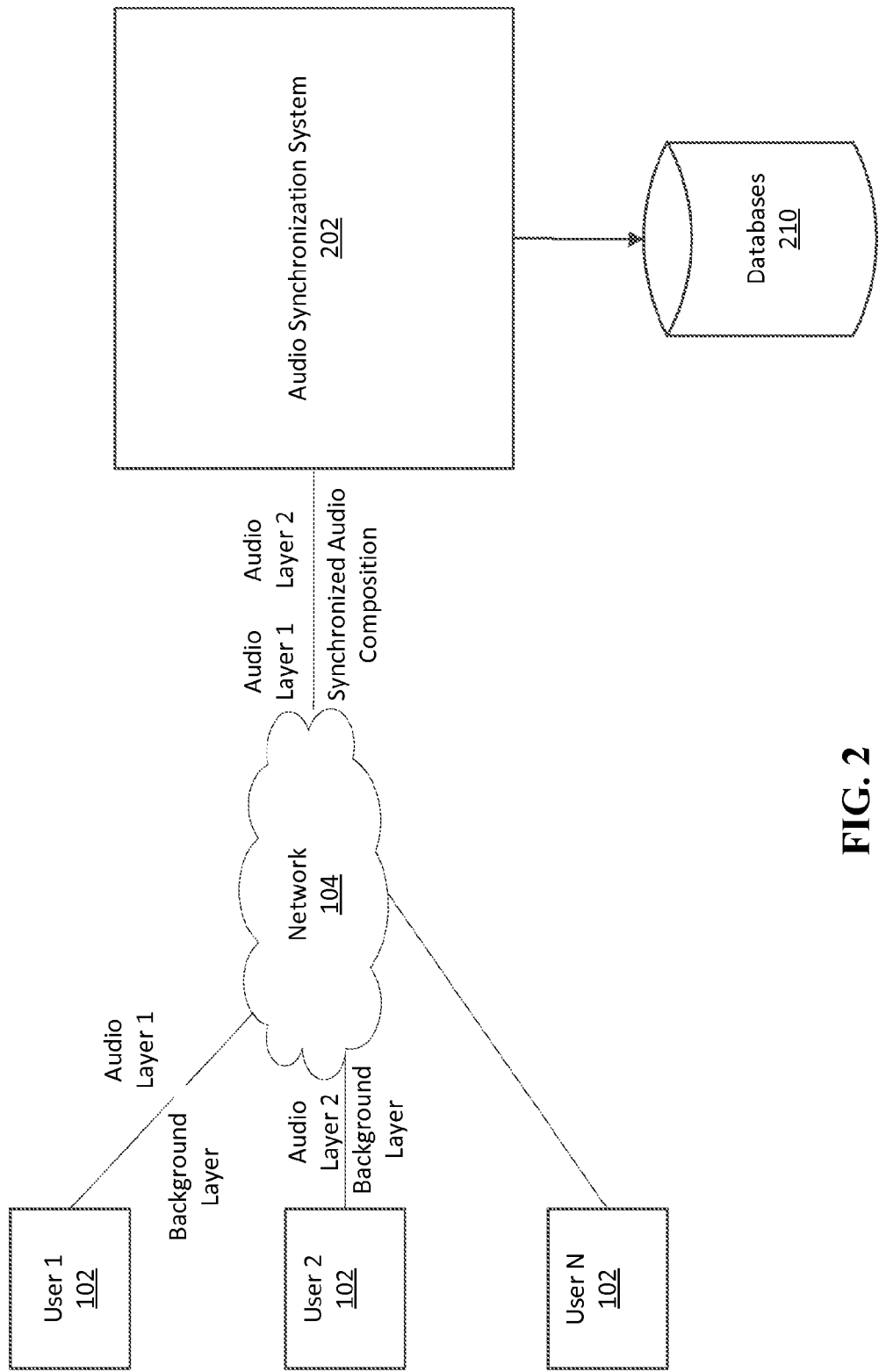

where:  D = Recording Signal Delay  &  d1 = d2

SYSTEM AND METHOD FOR AUTOMATIC SYNCHRONIZATION OF AUDIO LAYERS

CROSS-REFERENCE TO RELATED APPLICATIONS

The present application is a U.S. National Stage under 35 U.S.C. §371 of International Application No. PCT/US2013/043397, filed May 30, 2013, which claims the benefit of U.S. Provisional Patent Application No. 61/672,107, filed Jul. 16, 2012 and claims the benefit of Pakistan Application No. 345/2012, filed on Jun. 1, 2012. The contents of each application are incorporated herein by reference in their entirety.

BACKGROUND

In the recent past, users have attempted to record songs using online song recording platforms. In such song recording platforms, a user can record an audio layer over background layers to create songs. However, existing online song recording platforms have failed to successfully produce songs in which the various layers are synchronized.

SUMMARY

Systems and methods of synchronizing audio layers to form an audio composition, for example, a song are described herein. The audio layers can be recorded on the same or different computing devices, for example, personal computers and/or mobile devices. One or more audio layers can be synchronized with a reference audio, such as a singalong audio layer, another user recorded audio layer or a combination of one or more of both. The audio layers are later mixed or combined to form the audio composition.

In one aspect, a method of synchronizing audio layers to form an audio composition includes receiving, from a first computing device, at an audio synchronization system, a first audio layer having a first length. The audio synchronization system identifies a portion of a second audio layer with which the received first audio layer is to be synchronized. The audio synchronization system adjusts the first length to match a second length of the identified portion of the second audio layer by altering a tempo of the first audio layer based on a ratio of the first length and the second length. The audio synchronization system trims a recording signal delay from a beginning portion of the first audio layer and combines the first audio layer and the second audio layer to form an audio composition. In some implementations, the second audio layer includes a reference audio layer. In some implementations, the second audio layer includes a user recorded audio layer.

In some implementations, the audio synchronization system can alter the tempo of the first audio layer by calculating the ratio between the first length and the second length.

In some implementations, the first audio layer is received from a first computing device and the second audio layer is received from a second computing device. In some implementations, the first computing device is one of a personal computer and a mobile device.

In some implementations, the recording signal delay is a predetermined time delay. In some implementations, the audio synchronization system determines a recording signal delay of the first computing device. In some implementations, the audio synchronization system generates a plurality of audio pulses at the first computing device. The audio synchronization system receives a plurality of recordings corresponding to the generated plurality of audio pulses from an audio input device coupled to the first computing device. The audio synchronization system then determines an average time between receiving the generated plurality of audio pulses and generating the plurality of audio pulses; and identifies the average time as the recording signal delay of the first computing device.

In another aspect, an audio synchronization system includes a memory and a processor coupled to the memory. The processor is configured to receive from a first computing device, a first audio layer having a first length. The processor identifies a portion of a second audio layer with which the received first audio layer is to be synchronized. The processor adjusts the first length to match a second length of the identified portion of the second audio layer by altering the tempo of the first audio layer based on a ratio of the first length and the second length. The processor trims a recording signal delay from a beginning portion of the first audio layer and combines the first audio layer and the second audio layer to form an audio composition. In some implementations, the second audio layer includes a reference audio layer. In some implementations, the second audio layer includes a user recorded audio layer.

In yet another aspect, a computer-readable storage medium having processor executable instructions stored thereon, which when executed by the processor cause the processor to receive, from a first computing device, a first audio layer having a first length. The processor identifies a portion of a second audio layer with which the received first audio layer is to be synchronized. The processor adjusts the first length to match a second length of the identified portion of the second audio layer by altering the tempo of the first audio layer based on a ratio of the first length and the second length. The processor trims a recording signal delay from a beginning portion of the first audio layer and combines the first audio layer and the second audio layer to form an audio composition. In some implementations, the second audio layer includes a reference audio layer.

In yet another aspect, a method of synchronizing user audio layers of an audio composition includes adjusting the tempo of audio layers recorded on different hardware by calculating the ratio between the duration of the new user recorded audio layer and the play time of one or more background layers. This ratio is then used to apply the tempo effect to the new user recorded audio layer. In some implementations, the hardware can be personal computers and mobile devices. In some implementations, the background layers can include a singalong audio layer, another user recorded audio layer or a combination (mix) of one or more of both. In some implementations, a recording signal delay is calculated by generating audio pulses for detection by the microphone. The average time it takes for a pulse from generation to detection is the system hardware and software delay. This delay is then trimmed from the beginning of the new user recorded audio layer.

In yet another aspect, a system for synchronizing user audio layers of a single song include adjusting the tempo of audio layers recorded on different hardware by calculating the ratio between the duration of the new user recorded audio layer and the play time of one or more background layers. This ratio is then used to apply the tempo effect to the new user recorded audio layer. In some implementations, the hardware can be personal computers and mobile devices. In some implementations, the background layers can include a singalong audio layer, another user recorded audio layer or a combination (mix) of one or more of both. In some implementations, a recording signal delay is calculated by generating audio pulses for detection by the microphone. The average time it takes for a pulse from generation to detection is the system hardware and software delay. This delay is then trimmed from the beginning of the new user recorded audio layer.

BRIEF DESCRIPTION OF THE DRAWINGS

FIG. 2 depicts a system overview of one embodiment of a system for synchronizing audio layers received from one or more computing devices.

DETAILED DESCRIPTION

For purposes of reading the description of the various embodiments below, the following enumeration of the sections of the specification and their respective contents may be helpful:

Section A describes a network and computing environment which may be useful for practicing embodiments described herein; and Section B describes embodiments of systems and methods for synchronizing one or more audio layers to form an audio composition.

A. Network and Computing Environment

Figure 1A:
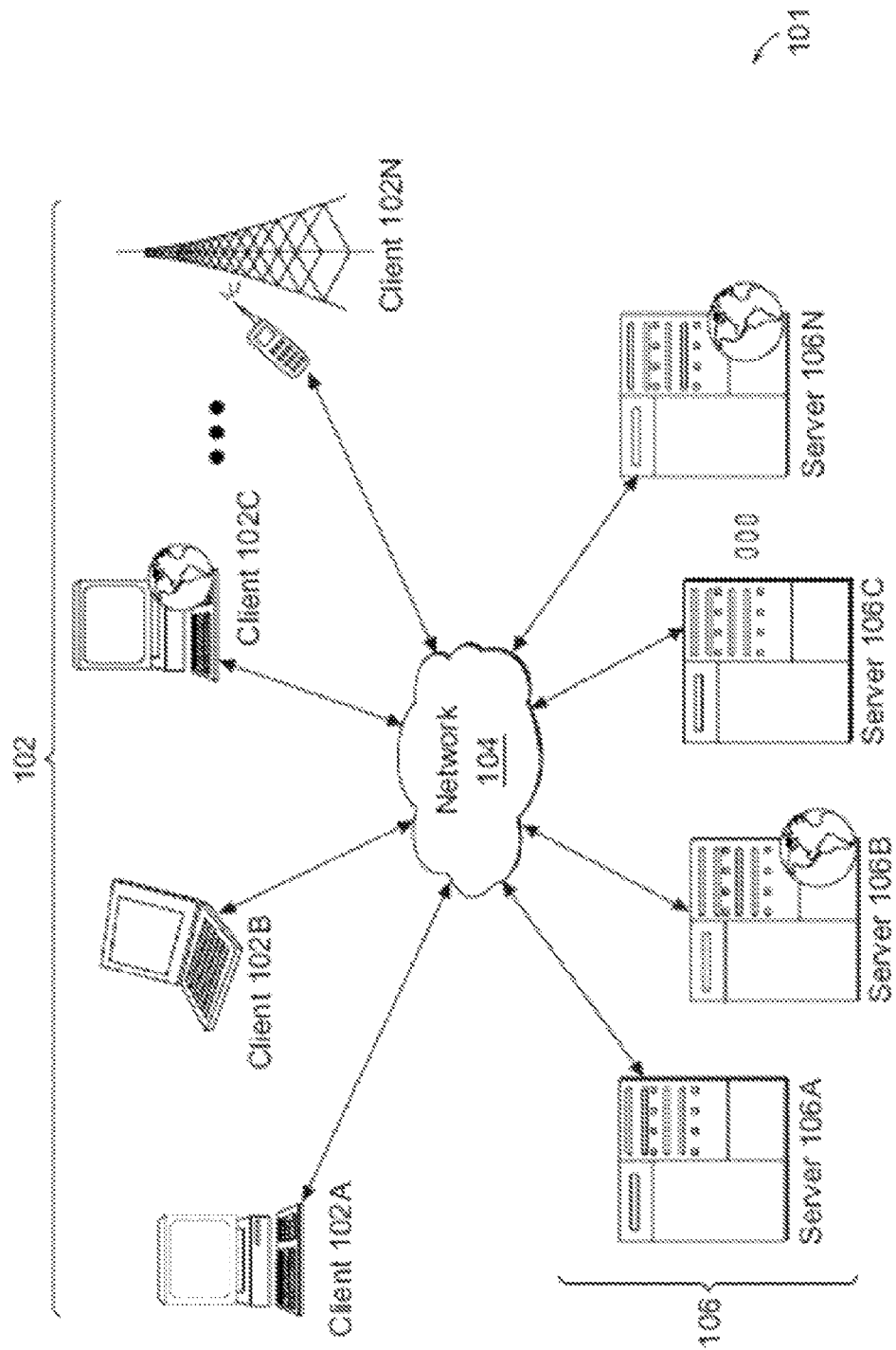
FIG. 1A is a block diagram illustrative of an embodiment of a networked environment with a client machine that communicates with a server.

Prior to discussing the specifics of embodiments of the systems and methods, it may be helpful to discuss the network and computing environments in which such embodiments may be deployed, including a description of components and features suitable for use in the present systems and methods. FIG. 1A illustrates one embodiment of a computing environment 101 that includes one or more client machines 102A-102N (generally referred to herein as "client machine(s) 102") in communication with one or more servers 106A-106N (generally referred to herein as "server(s) 106"). Installed in between the client machine(s) 102 and server(s) 106 is a network.

In one embodiment, the computing environment 101 can include an appliance installed between the server(s) 106 and client machine(s) 102. This appliance can mange client/server connections, and in some cases can load balance client connections amongst a plurality of backend servers. The client machine(s) 102 can in some embodiment be referred to as a single client machine 102 or a single group of client machines 102, while server(s) 106 may be referred to as a single server 106 or a single group of servers 106. In one embodiment a single client machine 102 communicates with more than one server 106, while in another embodiment a single server 106 communicates with more than one client machine 102. In yet another embodiment, a single client machine 102 communicates with a single server 106.

A client machine 102 can, in some embodiments, be referenced by any one of the following terms: client machine(s) 102; client(s); client computer(s); client device(s); client computing device(s); local machine; remote machine; client node(s); endpoint(s); endpoint node(s); or a second machine. The server 106, in some embodiments, may be referenced by any one of the following terms: server(s), local machine; remote machine; server farm(s), host computing device(s), or a first machine(s).

The client machine 102 can in some embodiments execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments include a client device 102 that displays application output generated by an application remotely executing on a server 106 or other remotely located machine. In these embodiments, the client device 102 can display the application output in an application window, a browser, or other output window. In one embodiment, the application is a desktop, while in other embodiments the application is an application that generates a desktop.

The computing environment 101 can include more than one server 106A-106N such that the servers 106A-106N are logically grouped together into a server farm 106. The server farm 106 can include servers 106 that are geographically dispersed and logically grouped together in a server farm 106, or servers 106 that are located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity, while in other embodiments the server farm 106 can include multiple server farms 106.

In some embodiments, a server farm 106 can include servers 106 that execute a substantially similar type of operating system platform (e.g., WINDOWS NT, manufactured by Microsoft Corp. of Redmond, Wash., UNIX, LINUX, or SNOW LEOPARD.) In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. In some embodiments, a server 106 may be a RADIUS server that includes a remote authentication dial-in user service. Some embodiments include a first server 106A that receives requests from a client machine 102, forwards the request to a second server 106B, and responds to the request generated by the client machine 102 with a response from the second server 106B. The first server 106A can acquire an enumeration of applications available to the client machine 102 and well as address information associated with an application server 106 hosting an application identified within the enumeration of applications. The first server 106A can then present a response to the client's request using a web interface, and communicate directly with the client 102 to provide the client 102 with access to an identified application.

Client machines 102 can, in some embodiments, be a client node that seeks access to resources provided by a server 106. In other embodiments, the server 106 may provide clients 102 or client nodes with access to hosted resources. The server 106, in some embodiments, functions as a master node such that it communicates with one or more clients 102 or servers 106. In some embodiments, the master node can identify and provide address information associated with a server 106 hosting a requested application, to one or more clients 102 or servers 106. In still other embodiments, the master node can be a server farm 106, a client 102, a cluster of client nodes 102, or an appliance.

One or more clients 102 and/or one or more servers 106 can transmit data over a network 104 installed between machines and appliances within the computing environment 101. The network 104 can comprise one or more sub-networks, and can be installed between any combination of the clients 102, servers 106, computing machines and appliances included within the computing environment 101. In some embodiments, the network 104 can be: a local-area network (LAN); a metropolitan area network (MAN); a wide area network (WAN); a primary network 104 comprised of multiple sub-networks 104 located between the client machines 102 and the servers 106; a primary public network 104 with a private sub-network 104; a primary private network 104 with a public sub-network 104; or a primary private network 104 with a private sub-network 104. Still further embodiments include a network 104 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network 104 that includes a wireless link where the wireless link can be an infrared channel or satellite band. The network topology of the network 104 can differ within different embodiments, possible network topologies include: a bus network topology; a star network topology; a ring network topology; a repeater-based network topology; or a tiered-star network topology. Additional embodiments may include a network 104 of mobile telephone networks that use a protocol to communicate among mobile devices, where the protocol can be any one of the following: AMPS; TDMA; CDMA; GSM; GPRS UMTS; 3G; 4G; or any other protocol able to transmit data among mobile devices.

Figure 1B:
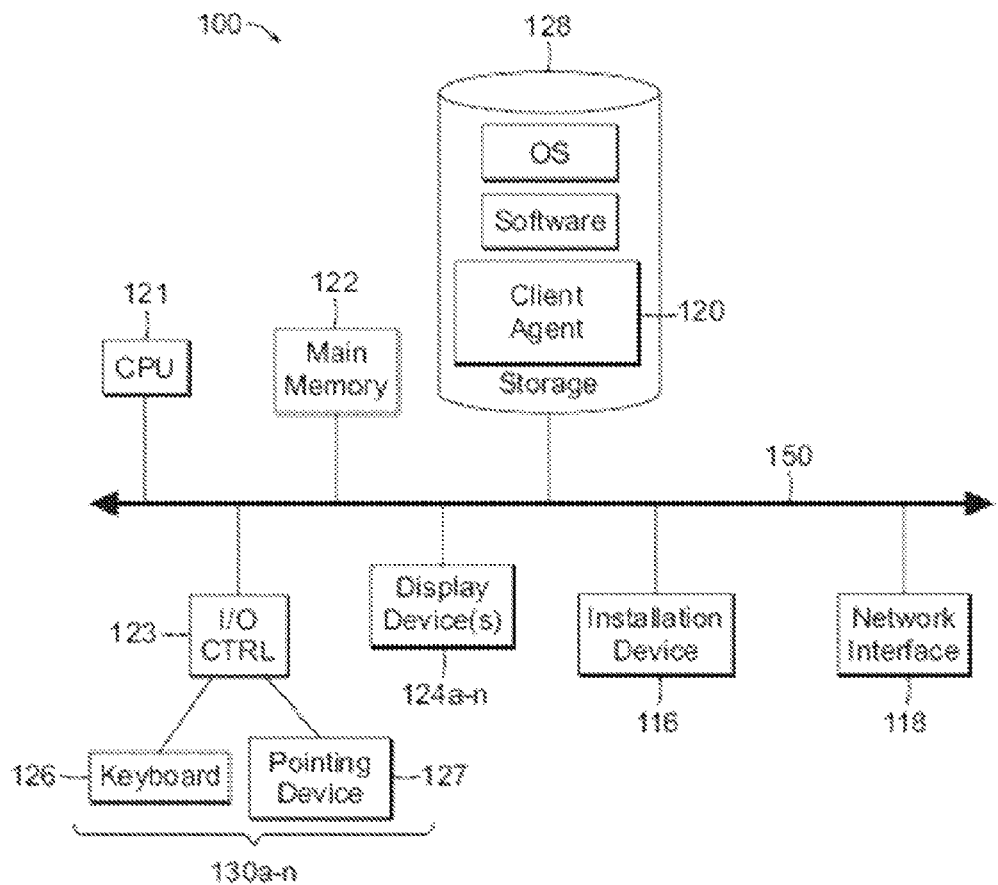
FIGS. 1B and 1C are block diagrams illustrative of embodiments of computing machines for practicing the methods and systems described herein.

Illustrated in FIG. 1B is an embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a central processing unit 121; a main memory 122; storage memory 128; an input/output (I/O) controller 123; display devices 124A-124N; an installation device 116; and a network interface 118. In one embodiment, the storage memory 128 includes: an operating system, software routines, and a client agent 120. The I/O controller 123, in some embodiments, is further connected to a key board 126, and a pointing device 127. Other embodiments may include an I/O controller 123 connected to more than one input/output device 130A-130N.

Figure 1C:
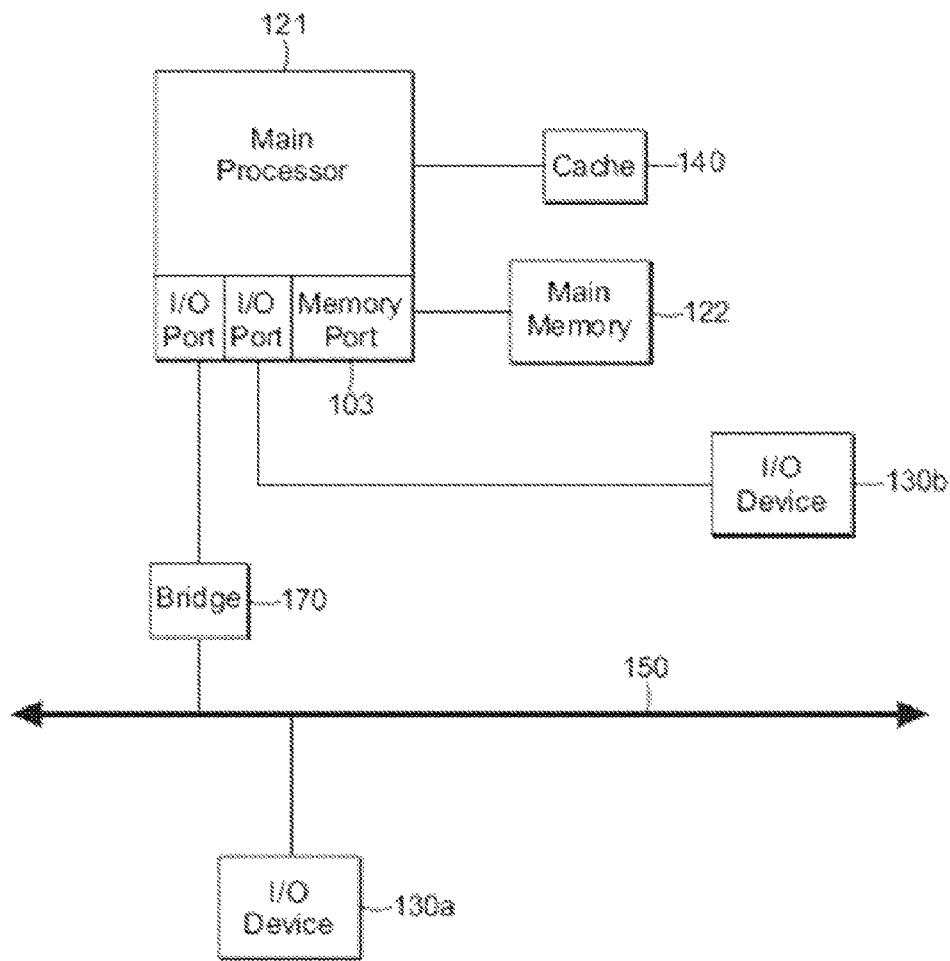

FIG. 1C illustrates one embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a bridge 170, and a first I/O device 130A. In another embodiment, the bridge 170 is in further communication with the main central processing unit 121, where the central processing unit 121 can further communicate with a second I/O device 130B, a main memory 122, and a cache memory 140. Included within the central processing unit 121, are I/O ports, a memory port 103, and a main processor.

Embodiments of the computing machine 100 can include a central processing unit 121 characterized by any one of the following component configurations: logic circuits that respond to and process instructions fetched from the main memory unit 122; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits. Still other embodiments of the central processing unit 122 may include any combination of the following: a microprocessor, a microcontroller, a central processing unit with a single processing core, a central processing unit with two processing cores, or a central processing unit with more than one processing core.

While FIG. 1C illustrates a computing device 100 that includes a single central processing unit 121, in some embodiments the computing device 100 can include one or more processing units 121. In these embodiments, the computing device 100 may store and execute firmware or other executable instructions that, when executed, direct the one or more processing units 121 to simultaneously execute instructions or to simultaneously execute instructions on a single piece of data. In other embodiments, the computing device 100 may store and execute firmware or other executable instructions that, when executed, direct the one or more processing units to each execute a section of a group of instructions. For example, each processing unit 121 may be instructed to execute a portion of a program or a particular module within a program.

In some embodiments, the processing unit 121 can include one or more processing cores. For example, the processing unit 121 may have two cores, four cores, eight cores, etc. In one embodiment, the processing unit 121 may comprise one or more parallel processing cores. The processing cores of the processing unit 121 may in some embodiments access available memory as a global address space, or in other embodiments, memory within the computing device 100 can be segmented and assigned to a particular core within the processing unit 121. In one embodiment, the one or more processing cores or processors in the computing device 100 can each access local memory. In still another embodiment, memory within the computing device 100 can be shared amongst one or more processors or processing cores, while other memory can be accessed by particular processors or subsets of processors. In embodiments where the computing device 100 includes more than one processing unit, the multiple processing units can be included in a single integrated circuit (IC). These multiple processors, in some embodiments, can be linked together by an internal high speed bus, which may be referred to as an element interconnect bus.

In embodiments where the computing device 100 includes one or more processing units 121, or a processing unit 121 including one or more processing cores, the processors can execute a single instruction simultaneously on multiple pieces of data (SIMD), or in other embodiments can execute multiple instructions simultaneously on multiple pieces of data (MIMD). In some embodiments, the computing device 100 can include any number of SIMD and MIMD processors.

The computing device 100, in some embodiments, can include an image processor, a graphics processor or a graphics processing unit. The graphics processing unit can include any combination of software and hardware, and can further input graphics data and graphics instructions, render a graphic from the inputted data and instructions, and output the rendered graphic. In some embodiments, the graphics processing unit can be included within the processing unit 121. In other embodiments, the computing device 100 can include one or more processing units 121, where at least one processing unit 121 is dedicated to processing and rendering graphics.

One embodiment of the computing machine 100 includes a central processing unit 121 that communicates with cache memory 140 via a secondary bus also known as a backside bus, while another embodiment of the computing machine 100 includes a central processing unit 121 that communicates with cache memory via the system bus 150. The local system bus 150 can, in some embodiments, also be used by the central processing unit to communicate with more than one type of I/O device 130A-130N. In some embodiments, the local system bus 150 can be any one of the following types of buses: a VESA VL bus; an ISA bus; an EISA bus; a MicroChannel Architecture (MCA) bus; a PCI bus; a PCI-X bus; a PCI-Express bus; or a NuBus. Other embodiments of the computing machine 100 include an I/O device 130A-130N that is a video display 124 that communicates with the central processing unit 121. Still other versions of the computing machine 100 include a processor 121 connected to an I/O device 130A-130N via any one of the following connections: HyperTransport, Rapid I/O, or InfiniBand. Further embodiments of the computing machine 100 include a processor 121 that communicates with one I/O device 130A using a local interconnect bus and a second I/O device 130B using a direct connection.

The computing device 100, in some embodiments, includes a main memory unit 122 and cache memory 140. The cache memory 140 can be any memory type, and in some embodiments can be any one of the following types of memory: SRAM; BSRAM; or EDRAM. Other embodiments include cache memory 140 and a main memory unit 122 that can be any one of the following types of memory: Static random access memory (SRAM), Burst SRAM or SynchBurst SRAM (BSRAM); Dynamic random access memory (DRAM); Fast Page Mode DRAM (FPM DRAM); Enhanced DRAM (EDRAM), Extended Data Output RAM (EDO RAM); Extended Data Output DRAM (EDO DRAM); Burst Extended Data Output DRAM (BEDO DRAM); Enhanced DRAM (EDRAM); synchronous DRAM (SDRAM); JEDEC SRAM; PC100 SDRAM; Double Data Rate SDRAM (DDR SDRAM); Enhanced SDRAM (ESDRAM); SyncLink DRAM (SLDRAM); Direct Rambus DRAM (DRDRAM); Ferroelectric RAM (FRAM); or any other type of memory. Further embodiments include a central processing unit 121 that can access the main memory 122 via: a system bus 150; a memory port 103; or any other connection, bus or port that allows the processor 121 to access memory 122.

One embodiment of the computing device 100 provides support for any one of the following installation devices 116: a CD-ROM drive, a CD-R/RW drive, a DVD-ROM drive, tape drives of various formats, USB device, a bootable medium, a bootable CD, a bootable CD for GNU/Linux distribution such as KNOPPIX®, a hard-drive or any other device suitable for installing applications or software. Applications can in some embodiments include a client agent 120, or any portion of a client agent 120. The computing device 100 may further include a storage device 128 that can be either one or more hard disk drives, or one or more redundant arrays of independent disks; where the storage device is configured to store an operating system, software, programs applications, or at least a portion of the client agent 120. A further embodiment of the computing device 100 includes an installation device 116 that is used as the storage device 128.

The computing device 100 may further include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 100 includes a network interface 118 able to communicate with additional computing devices 100' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 118 can comprise any one of: a built-in network adapter; a network interface card; a PCMCIA network card; a card bus network adapter; a wireless network adapter; a USB network adapter; a modem; or any other device suitable for interfacing the computing device 100 to a network capable of communicating and performing the methods and systems described herein.

Embodiments of the computing device 100 include any one of the following I/O devices 130A-130N: a keyboard 126; a pointing device 127; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 123 may in some embodiments connect to multiple I/O devices 103A-130N to control the one or more I/O devices. Some embodiments of the I/O devices 130A-130N may be configured to provide storage or an installation medium 116, while others may provide a universal serial bus (USB) interface for receiving USB storage devices such as the USB Flash Drive line of devices manufactured by Twintech Industry, Inc. Still other embodiments include an I/O device 130 that may be a bridge between the system bus 150 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

In some embodiments, the computing machine 100 can execute any operating system, while in other embodiments the computing machine 100 can execute any of the following operating systems: versions of the MICROSOFT WINDOWS operating systems; the different releases of the Unix and Linux operating systems; any version of the MAC OS manufactured by Apple Computer; OS/2, manufactured by International Business Machines; Android by Google; any embedded operating system; any real-time operating system; any open source operating system; any proprietary operating system; any operating systems for mobile computing devices; or any other operating system. In still another embodiment, the computing machine 100 can execute multiple operating systems. For example, the computing machine 100 can execute PARALLELS or another virtualization platform that can execute or manage a virtual machine executing a first operating system, while the computing machine 100 executes a second operating system different from the first operating system.

The computing machine 100 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a netbook, a tablet; a device of the IPOD or IPAD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA); any computing device that has different processors, operating systems, and input devices consistent with the device; or any other mobile computing device capable of performing the methods and systems described herein. In still other embodiments, the computing device 100 can be any one of the following mobile computing devices: any one series of Blackberry, or other handheld device manufactured by Research In Motion Limited; the iPhone manufactured by Apple Computer; Palm Pre; a Pocket PC; a Pocket PC Phone; an Android phone; or any other handheld mobile device. Having described certain system components and features that may be suitable for use in the present systems and methods, further aspects are addressed below.

B. Synchronizing One or More Audio Layers

FIG. 2 depicts a system overview of one embodiment of a system for synchronizing audio layers received from one or more computing devices. An audio synchronization system 202 is configured to communicate with one or more user computing devices 102 via a network 104. The audio synchronization system 202 can be configured to receive one or more audio layers from one or more user computing devices 102, synchronize the audio layers to generate a synchronized audio composition, and provide the synchronized audio composition to users on the user computing devices. The audio synchronization system 202 can access one or more data stores, such as databases 210. These databases 210 can include one or more song repositories, profile information one or more users, amongst others.

As described herein, techniques for automatically synchronizing audio layers recorded on multiple devices are presented herein. These techniques can be implemented by the audio synchronization system 202. The audio synchronization system 202 can be configured to receive one or more audio layers from one or more devices. In some implementations, a first audio layer recorded on a first device and a second audio layer recorded on a second device are received by the system. The first audio layer and the second audio layer are then synchronized with one another and with any other audio layers, including background layers. In some implementations, the second audio layer is a background layer with which the first audio layer is to be synchronized.

Since the various audio layers are received from separate devices, each of the audio layers may have different play lengths due to variations in the components of each of the devices. This variation in play length results in a slightly different tempo and is referred to herein as tempo variation. It has been determined that different devices, when attempting to record the same audio layer, record audio layers that have varying play lengths even if the properties of the recordings are exactly the same (i.e. frame rate, bit rate, bit depth). For instance, various devices, such as cell phones, laptops, desktops can record audio layers, but each of them can have different play lengths. A second type of variation relates to a delay in a recording layer relative to a background layer. Specifically, a user recorded audio layer is often recorded while singing or performing along with a background set of layers. Even if a user sings exactly along with the background layers, the new user recorded layer will have a slight lag relative to the background layers. This is caused by the hardware/software audio delays in a system, and referred to herein as the recording signal delay.

An audio track or audio composition includes one or more audio layers. The audio track is a synchronized compilation of the one or more audio layers. These audio layers may extend for the full duration of the audio track or only a portion of the audio track. In some implementations, the audio track can be a song or other musical piece. For example, a song can include a first vocal layer corresponding to a male voice, a second vocal layer corresponding to a female voice, a third instrument layer corresponding to a guitar piece, and a background layer that includes all the other audio components that form the audio track.

The background layer is sometimes referred to herein as the singalong audio layer or reference layer and serves as the audio layer with which each of the other layers can be compared for the purposes of synchronization. The singalong audio layer can be similar to a karaoke track. A user can record a vocal layer in which the user sings along with the singalong audio layer or an instrument layer in which the user plays an instrument along with the singalong audio layer. In some implementations, the user may record both the vocal layer and the instrument layer simultaneously along with the singalong audio layer. The singalong audio layer may be extracted from an online content hosting website, such as a video hosting website or audio hosting website, or a file uploaded by the user. In some implementations, singalong audio layers may be imported from a list of available singalong audio layers. Various effects can be applied to audio content to extract one or more audio layers. For instance, vocals can be removed from an audio content item by applying a center cut algorithm. Similarly, other filters can be used to strip particular instruments, sounds, or vocals from any audio content item.

A user recorded audio layer is an audio layer recorded by the user. In some implementations, the user recorded audio layer is recorded on a user computing device, such as a personal computer, tablet or a mobile device. In some implementations, the audio layer is recorded via an audio input device, such as a microphone, that is coupled to the user computing device. The user recorded audio layer may be recorded while performing along with a singalong audio layer, another user recorded layer, or an audio layer that includes the singalong audio layer, and the other user recorded layer. In some implementations, a user recorded audio layer can be recorded as a stand alone user recorded audio layer without any other audio layer being played. Accordingly, a user may record a stand alone user recorded layer and then other user audio layers may be performed along with the first user recorded layer.

Two example scenarios are provided below to explain how the audio synchronization system works.

Scenario I

User 1 creates a song and uploads an audio file to create a singalong audio layer. User 1 records a user recorded audio layer while singing along with the male singer in the singalong audio layer. Once user 1 has recorded his layer, he creates a new user recorded audio layer and shares it with user 2.

User 2 records her user recorded audio layer while singing along with a mix of singalong audio layer and the user recorded audio layer recorded by user 1. User 2 sings along with the female vocalist in the singalong audio layer.

There are three audio layers in the audio track, namely, the singalong audio layer, user recorded layer by user 1 with the male vocals and user recorded layer by user 2 with the female vocals. The publisher of the song, user 1, then removes vocals from the singalong audio layer and mixes the three audio layers into a single song, containing music without vocals from the singalong audio layer, and male and female vocals from user recorded audio layer 1 and 2 respectively.

Scenario II

User 1 wishes to sing an original song and therefore will not be using a singalong audio layer. He records his vocals as a user recorded audio layer. He then creates a new layer and shares it with user 2 to play the guitar for his song.

User 2 records a second user recorded audio layer by playing the guitar along with the user recorded layer recorded by user 1.

User 1 now creates a third layer and shares it with user 3 to play drums for his song. User 3 records a third user recorded audio layer by playing the drums along the mix of user recorded layers recorded by user 1 and user 2.

There are three user recorded audio layers in the song. First recorded by user 1 containing vocals, second recorded by user 2 containing guitar cords and finally the third recorded by user 3 containing drum beats. The publisher of the song, user 1, then mixes the three audio layers into a single song performed by user 1, 2 and 3.

Audio layers are synchronized when the tempos and timing of each of the layers match with one another. For example, the synchronized audio composition can be a song that includes a background layer that corresponds to a karaoke version of a song. The first audio layer can correspond to a male vocalist singing the song, while the second audio layer can correspond to a female vocalist singing the song. The first audio layer and the second audio layer can be synchronized with the background layer such that when the synchronized audio composition is played, the timing of the male vocalist's recording and the female vocalist's recording match the timing of the background layer.

Figure 3:
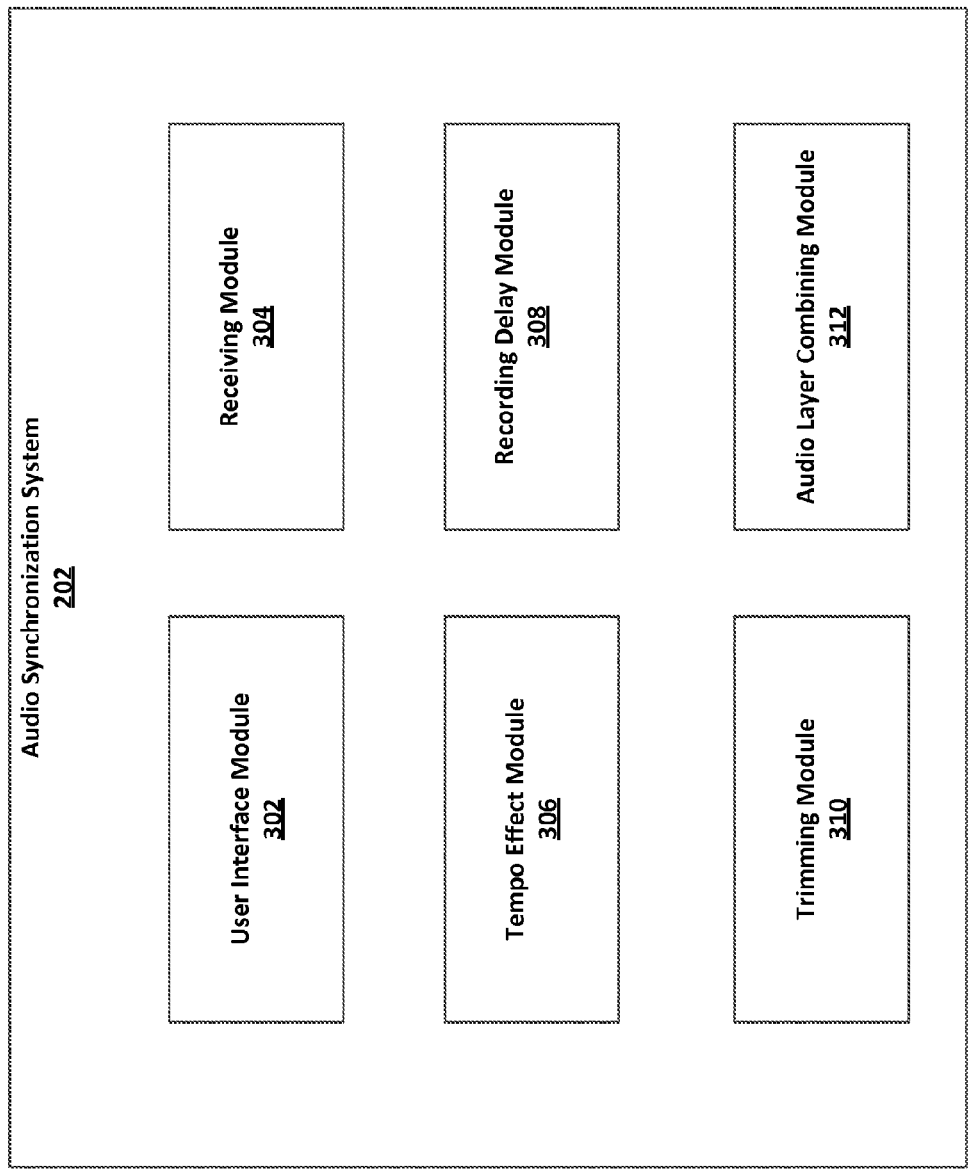
FIG. 3 depicts system details of one embodiment of a system for synchronizing audio layers received from one or more computing devices.

FIG. 3 depicts system details of one embodiment of a system for synchronizing audio layers received from one or more computing devices. The audio synchronization system 202 can include one or more modules to perform various functions. The audio synchronization system 202 can include a user interface module 302, a receiving module 304, a tempo effect module 306, a recording delay module 308, a trimming module 310 and an audio layer combining module 312. In some implementations, the audio synchronization system 202 can include one or more additional modules to perform various other functions.

While the subject matter described herein is presented in the general context of program modules that execute in conjunction with the execution of an operating system and application programs on a computer system or embedded processor system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Still referring to FIG. 3, the user interface module 302 is designed, constructed or configured to provide a user interface to one or more user computing devices via the network 104. The user interface module 302 can be configured to manage one or more accounts associated with users of the user computing devices. The user interface module 302 can be configured to receive requests from users via the user interface to create one or more audio compositions. In some implementations, the user interface module 302 can be configured to provide notifications to users, receive requests from users, publish songs of users, and perform additional features that are apparent from the screenshots shown in FIGS. 6A-6E and 7A-7D, amongst others.

The receiving module 304 is configured to designed, constructed or configured to receive one or more audio layers from users to synchronize with one or more other audio layers. The audio layers can be received as audio files. Examples of various formats of these files include *.mp3, *.wma, *.wav, amongst others. In some implementations, the receiving module can receive a time stamp indicating the length of the audio layer. In some implementations, the receiving module can determine, via the user interface, a play time of a background layer that extends for a duration that corresponds to the play time of a user recorded audio layer. In some implementations, the receiving module can determine the play time of the background layer by identifying a start time and a stop time on an audio player that plays the background layer. The start time corresponds to the time on the audio player when the user starts recording the user recorded audio layer, and the stop time corresponds to the time on the audio player when the user ends the recording of the user recorded audio layer. As described above, the duration between the start time and the stop time, which can be the play time of the background layer can be different from the play time of the user recorded audio layer.

The tempo effect module 306 can be designed, constructed or configured to identify or determine a play time or length of the user recorded audio layer. In some implementations, the tempo effect module 306 can be configured to determine the durations in milliseconds. In some implementations, the play time of the user recorded audio layer is encoded in the audio file received from the user computing device. In some implementations, the tempo effect module 306 can extract the play time of the audio layer from the audio file. The tempo effect module 306 can also be configured to identify a play time of a reference audio layer with which the user recorded audio layer is to be synchronized. The reference audio layer can be the audio layer provided to the user computing device for which the start time and stop time was identified by the receiving module 304. In some implementations, the tempo effect module 306 can be configured to identify a play time of a portion of the reference audio layer that corresponds to the user recorded audio layer. For example, if the user recorded audio layer began recording when the background layer was at 50.85 seconds, and the user recorded audio layer stopped recording when the background layer was at 95.85 seconds, the portion of the background layer with which the user recorded audio layer is to be synchronized extends from 50.85 seconds to 95.85 seconds. Although the duration of this portion is 45 seconds, the duration of the user recorded audio layer can be slightly less than or greater than the 45 seconds. This is because a typical user computing device that encodes the user recorded audio layer can experience a difference in the play time of the user recorded audio layer and the corresponding portion of the background layer.

The tempo effect module 306 can be configured to determine a ratio of the play time of the user recorded audio layer to the play time of the corresponding portion of the background. This ratio can range between 0.8 to 1.2, 0.9 to 1.1, 0.95 to 1.05, 0.98 to 1.02, amongst others. The tempo effect module 306 can then determine and apply a tempo effect equivalent to the ratio of user recorded layer to the background audio layer. By applying the tempo effect, the tempo of the user recorded audio layer increases and the play time of the user recorded audio layer shortens to match the play time of the background layer. Examples of software that can adjust the tempo of an audio layer are available online. In some implementations, the tempo effect module 306 can include software that is available through Sound eXchange (SoX), commercially available for use at sox.sourceforge.net. In some implementations, the tempo effect module 306 can apply a tempo effect via the following example function:

Sox.input.wav output.wav tempo 0.9 where 0.9 is the ratio of the play time of the user recorded audio layer to the play time of the corresponding portion of the background. By applying this tempo effect, the tempo of the tempo-corrected user recorded audio layer will become 90% of the original user recorded audio layer and the length of the tempo-corrected user recorded audio layer will be 110% of the length of the original user recorded audio layer.

The recording delay module 308 can be designed, constructed or configured to identify a recording delay to be applied to the user recorded audio layer. In some implementations, the recording delay module 308 can be configured to determine a recording delay of the user computing device on which the user recorded audio layer was recorded. In some implementations, the recording delay module 308 can run a recording delay determination test to determine the recording delay of the computing device. In some implementations, the recording delay module 308 can be configured to execute a script on the user computing device through which the computing device can execute the recording delay determination test. In some implementations, the recording delay module 308 can be configured to generate one or more audio pulses at the user computing device. These audio pulses can be generated by sending an instruction to the user computing device. The audio pulses can be output through an audio output component of the user computing device. The recording delay module 308 can further be configured to identify that one or more of the audio pulses have been recorded by an audio input component of the user computing device. In some implementations, the recording delay module 308 can be configured to determine the time delay from the time the instructions to generate the audio pulses were sent to the user computing device to the time the recording delay module 308 identifies that the audio pulses were recorded at the user computing device.

The trimming module 310 can be designed, constructed or configured to trim the user recorded audio layer by the identified recording delay that is identified by the recording delay module. In some implementations, the trimming module 310 can remove a beginning portion of the user recorded audio layer. In some implementations, the beginning portion can have a duration equal to the identified recording delay. By trimming the user recorded audio layer by the recording delay, the difference in the lengths of the user recorded audio layer and the background layer are now different.

The audio layer combining module 312 can be designed, constructed or configured to combine the trimmed user recorded audio layer and the one or more background layers. In some implementations, the audio layer combining module 312 simply combines the trimmed user recorded audio layer and the one or more background layers by aligning the start times of the trimmed user recorded audio layer and the one or more background layers. In some implementations in which the user recorded audio layer corresponds to a portion of the background layers, the audio layer combining module 312 can combine the trimmed user recorded audio layer and the corresponding portion of the background layer by aligning the start time of the trimmed user recorded audio layer with a corresponding start time of the portion of the background layer with which to synchronize the user recorded audio layer. In this way, the audio layer combining module can form an audio composition in which the user recorded audio layer and the background layers are synchronized.

The audio synchronization system 202 can be configured, constructed or designed to include one or more other audio processing modules. Some of these audio processing modules are commercially available through Sound Exchange (SoX) or other online audio processing software.

The audio synchronization system 202 is further configured to combine additional audio layers in a similar fashion. Any layer, even if it is a user recorded audio layer, can serve as a background layer. As such, two user recorded audio layers can be synchronized with one another using the system described herein.

The audio synchronization system 202 can further be configured to operate a website through which one or more users can interact with one another and with the audio synchronization system. As described below with FIGS. 6A-6E and 7A-&C, aspects of the website are described herein.

Figure 4A:
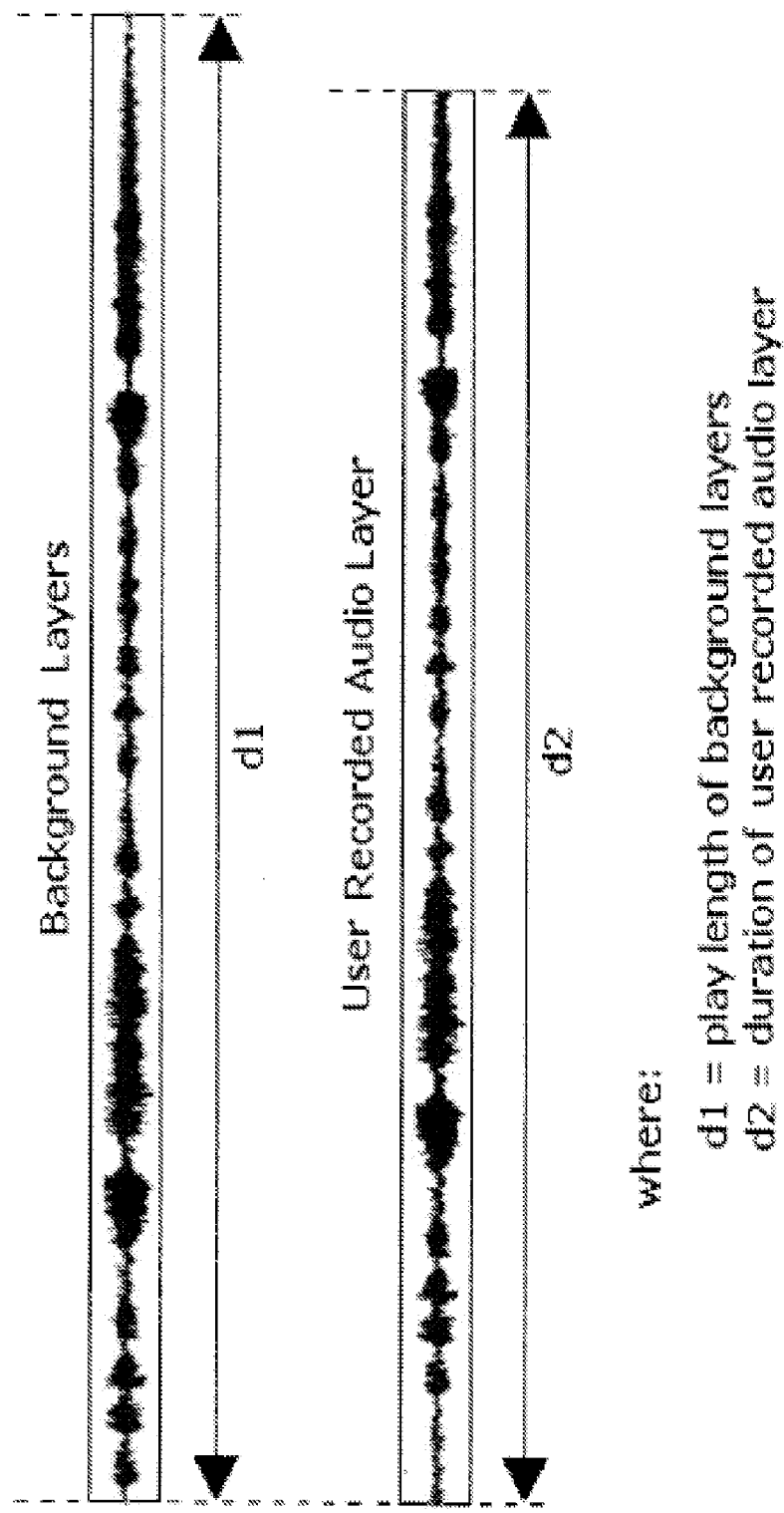
FIG. 4A shows a background layer and a user recorded audio layer having two separate durations.

Referring now to FIG. 4A, example waveforms of a background layer and a user recorded audio layer having two separate durations is shown. The audio synchronization system may be configured to receive one or more of the background layer and the user recorded audio layer from one or more devices. The audio layers may be received as audio files. In some implementations, the background layer can be extracted from an audio content source by the audio synchronization system or received from another device. The user recorded audio layer can be received from a remote device associated with a user. The above two wave forms have different play lengths due to tempo variation. In this case, the play length or duration of the user recorded layer is shorter than the background layers. In some implementations, the play length or duration of the user recorded layer can be longer than the background layers depending on the hardware on which the user recorded layer was encoded.

Still referring to FIG. 4A, the wave form of the user recorded layer has a play time or length that is shorter than the play time of the background layers. This difference in length is due to the computing device of the user. Different computing devices are designed, constructed or configured such that when an audio recording is encoded to an audio file, the actual length of time from the time the user begins the recording and stops the recording can differ from the length of the audio layer that is encoded as an audio file. This inherent time difference varies from one computing device to another computing device. This is because of the software and hardware components of every device, including but not limited to the software device drivers and audio hardware attached to each device. To account for the time difference during the encoding process, the tempo effect is applied. This time difference relates to a tempo variation between the user recorded audio layer and the background layers. Furthermore, the tempo variation can also vary for the same device at different instances, based at least in part on how busy the audio device is at a particular time.

The background layer has a Background Layer Duration (d1) that is measured from the time when the user initiates the recording of the user recorded audio layer to when the recording of the user recorded audio layer is terminated. In some implementations, the recording of the user recorded audio layer is terminated when the background layers end and recording stops automatically or when the user stops the recording manually. In some implementations, the background layer is playing while the user recorded audio layer is being recorded.

User recorded Layer duration (d2) is measured as the total duration of the user recorded audio layer. As shown in FIG. 4A, this duration d2 is different from the duration d1 due to delays in the device.

Both d1 and d2 are provided to the audio synchronization system along with the new user recorded audio layer. A tempo effect is applied to the recording, using the ratio of the durations d1 and d2. In some implementations, the ratio is d2/d1. The tempo effect can be implemented by using existing audio editing software known to people having ordinary skill in the art.

Figure 4B:
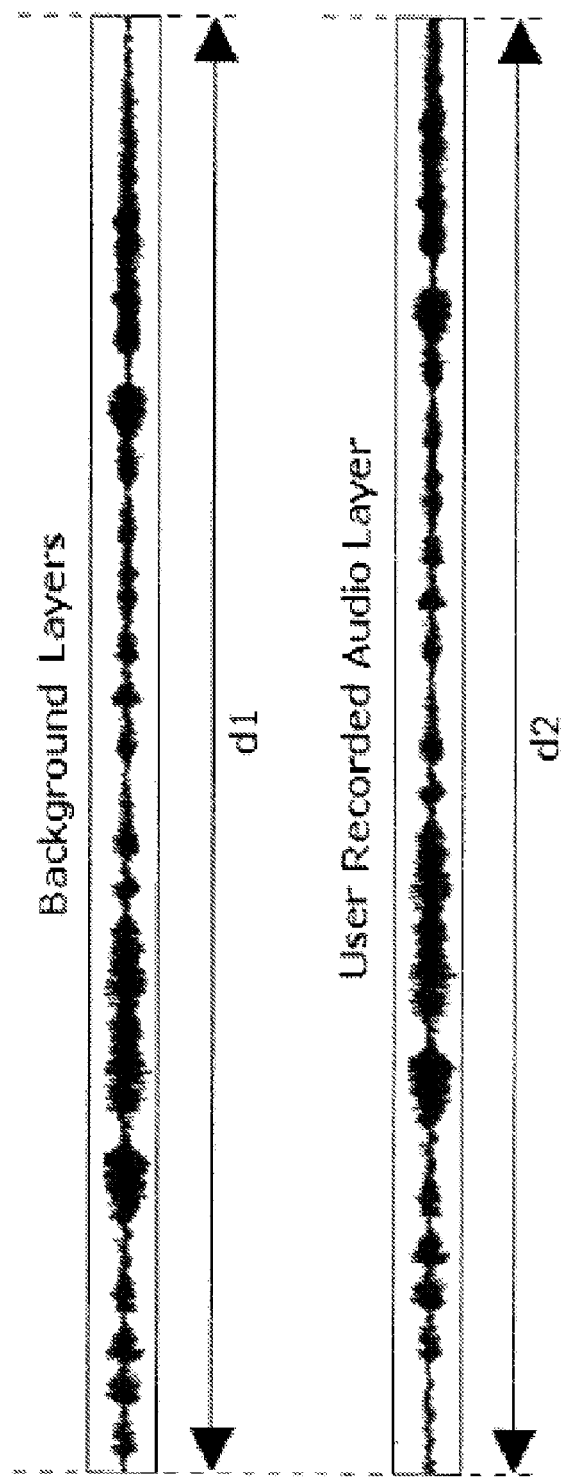
FIG. 4B shows the background layer and the user recorded audio layer after applying a tempo effect.

Applying the tempo effect results in the duration of the tempo-corrected user recorded audio layer to be exactly equal to the duration d1 of the background layers. FIG. 4B shows an example embodiment of the background layer and the user recorded audio layer after applying a tempo effect.

Although the two layers now have the same duration, the audio layers may still not be synchronized. As described above, the tempo-effect does not address any recording signal delays. Recording signal delays are addressed by estimating the average computing device recording signal delay on a particular system at a particular time. In some implementations, a sound check is performed to estimate the average computing device recording signal delay. The audio synchronization system can generate one or more sound pulses at the user computing device. The time for each sound pulse, from and including generation, to registering on the microphone is recorded by the audio synchronization system.

In a sound check, a user may be prompted to move the microphone closer to the speakers and turn up the volume. In some implementations, the user may initiate the sound check or it may be initiated automatically by the audio synchronization system or the user device. In some such implementations, the audio synchronization system is configured to control aspects of the user device. In some implementations, the user device may have to download an application or grant access to the audio synchronization system to control aspects of the user device. For instance, the audio synchronization system can control the sound and recording controls of the user's device. In some implementations, a Flash plugin is used for accessing the recording controls of the user device.

Upon initiation of the sound check, the user device's audio output device receives instructions to generate a pulse, which is then outputted. The outputted pulse is detected by the user device's microphone or other sound recording device. The audio synchronization system determines the time it took for the pulse to be generated and registered by the microphone. This is done by initiating a clock when instructions to generate a pulse are provided and stopping the clock upon receiving an input signal recorded by the microphone. Subsequent sound pulses are then generated and recorded and the average recording delay is calculated. The reason for repeating this process several times is to get a better estimate of the delay. A false detection can occur if an outside environment noise is falsely registered by the system as a pulse (for example the sound of a door closing or a chair squeaking) Several tests ensure that the error in case of a false detection is minimized. A sound pulse can be any short sound which has high amplitude from the start. This is to make sure that the start point of the pulse is detected immediately.

Figure 4C:
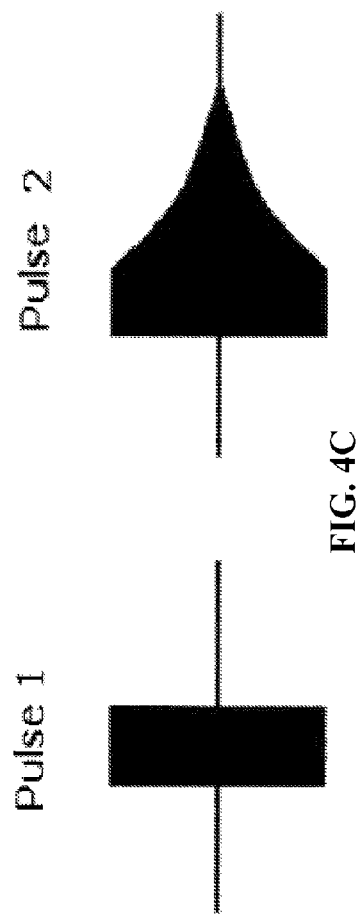
FIG. 4C shows example sound pulses that can be used to calculate the recording signal delay.

Referring now to FIG. 4C, example waveforms of two different valid pulses are shown. In each of these pulses, the pulses begin with a high amplitude beginning Pulse 1 is a pulse that outputs an audio signal having a constant high amplitude while pulse 2 is a pulse that outputs an audio signal having a diminishing amplitude. Other pulses that have a initial amplitude greater than a threshold amplitude can also be used. In such implementations, it is desirable for the pulse to have a constant or diminishing amplitude.

The time for each sound pulse, from and including generation, to registering on the microphone is recorded by the system. This time includes the time for:

processing the audio pulse signal by the device driver software, converting the electric signal to sound signal by the speakers, registering of the sound signal by the microphone hardware, and encoding of the microphone signal to digital audio by the device driver software.

The audio synchronization system is further configured to estimate the computing device recording signal delay (D) by taking the average sound pulse delay, from generation to detection. This delay (D) is then passed to the audio synchronization system, along with d1, d2 and new user recorded layer.

As shown in FIG. 4B, after the audio synchronization system applies the tempo effect to the user recorded audio layer, the result is two audio signals having the same duration. However, the wave form of the new user recorded audio layer is not aligned with the wave form of the background layers due to the recording signal delay.

Figure 4D:
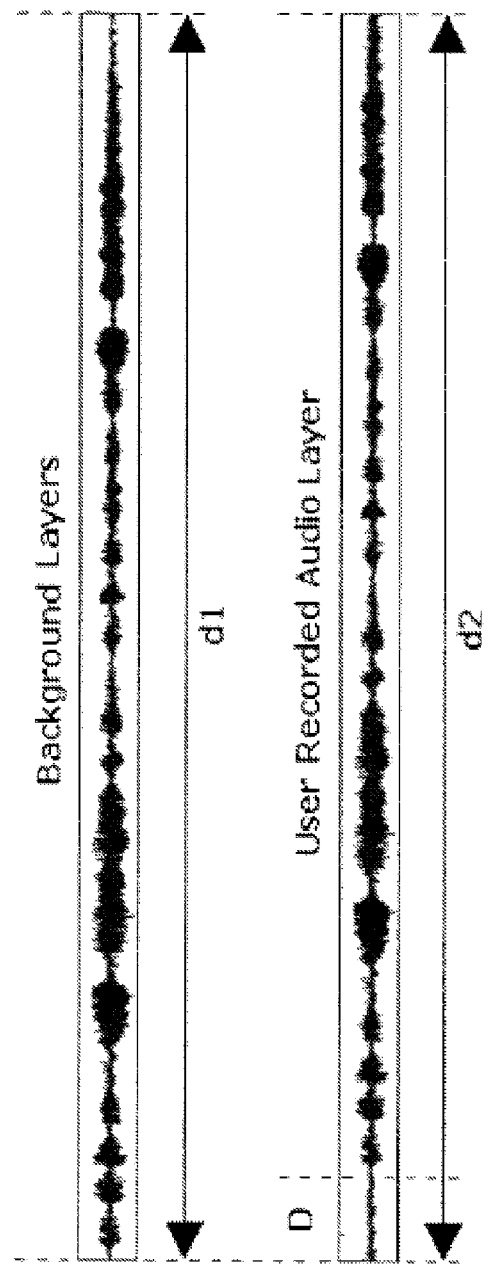
FIG. 4D shows the background layer and the user recorded audio layer indicating the recording signal delay.

Referring now to FIG. 4D, the background layer and the tempo-corrected user recorded audio layer are shown along with an indication of the average sound pulse delay indicating the recording signal delay.

The audio synchronization system is further configured to apply a trim effect. The trim effect is applied by removing a beginning portion of the tempo-corrected user recorded audio layer having a duration that is equal to the average recording signal delay (D). In other words, if the average recording signal delay is 400 ms, the first 400 ms of the tempo-corrected user recorded audio layer is removed. In this way, the length of the trimmed user recorded audio layer is shorter than the tempo-corrected user recorded audio layer and the background layer by 400 ms.

Figure 4E:
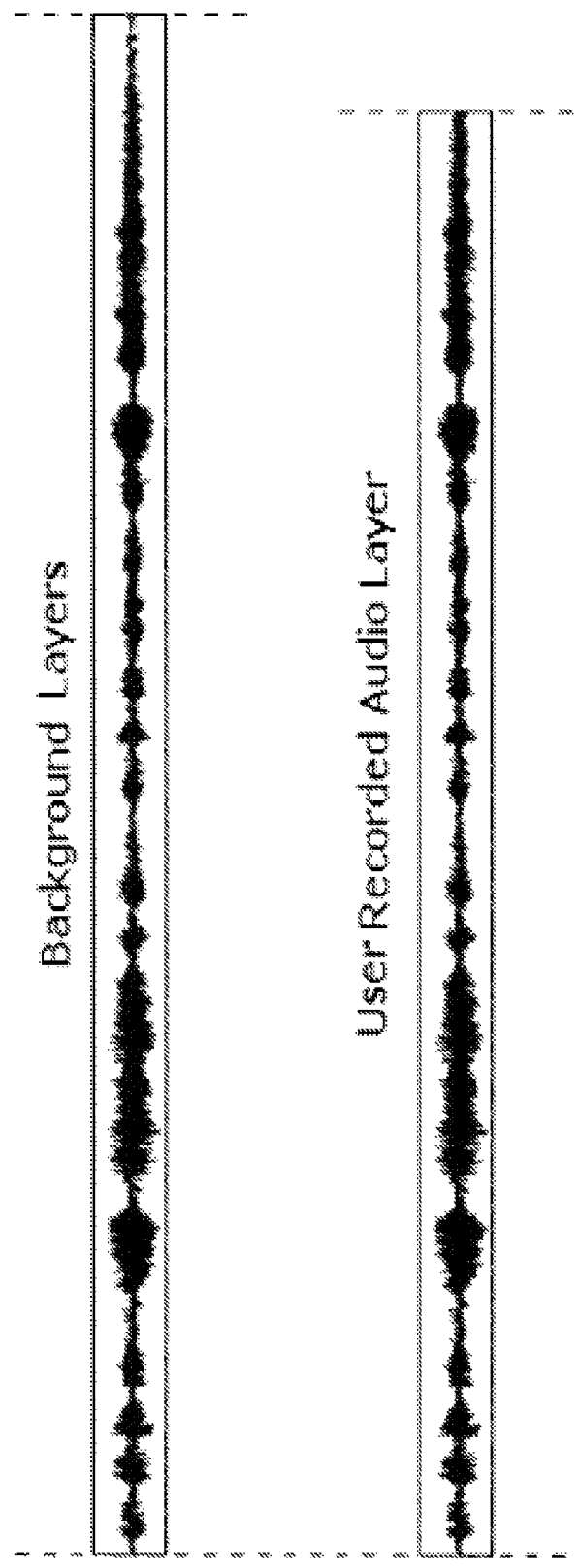
FIG. 4E shows the background layer and the user recorded audio layer after both the tempo effect and a trim effect have been applied.

FIG. 4E shows the waveform of the background layer and the trimmed user recorded audio layer. As shown, the trimmed user recorded audio layer has a duration that is shorter than the background layer but the waveforms of the background layer and the trimmed user recording audio layer are synchronized. In this way, when both the background layer and the trimmed user recording audio layer are mixed together, the two layers will be in synchronization or alignment with the existing layers in the song perfectly.

Figure 5:
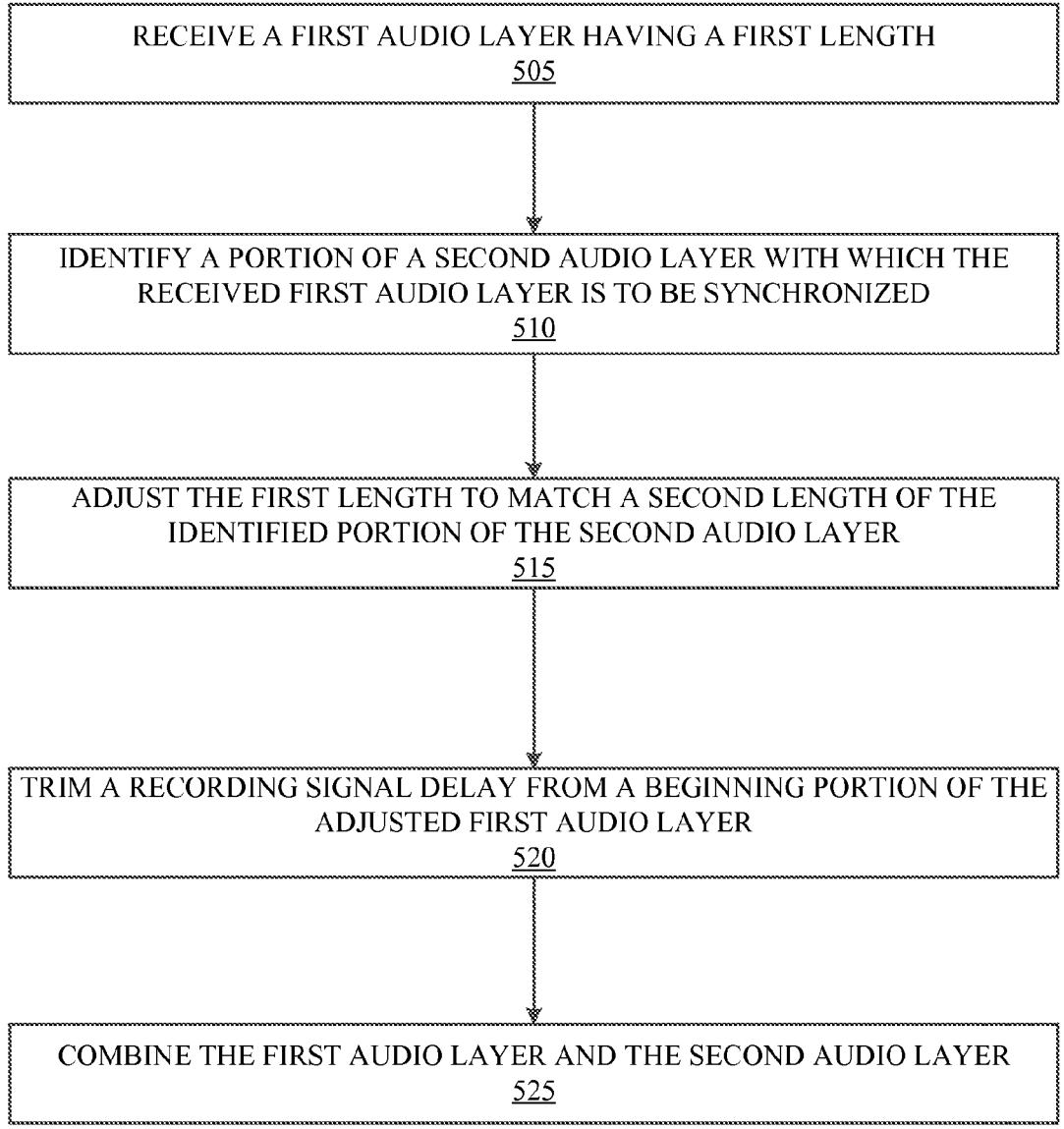
FIG. 5 depicts one embodiment of a method for synchronizing audio layers received from one or more computing devices.
Figure 6A:
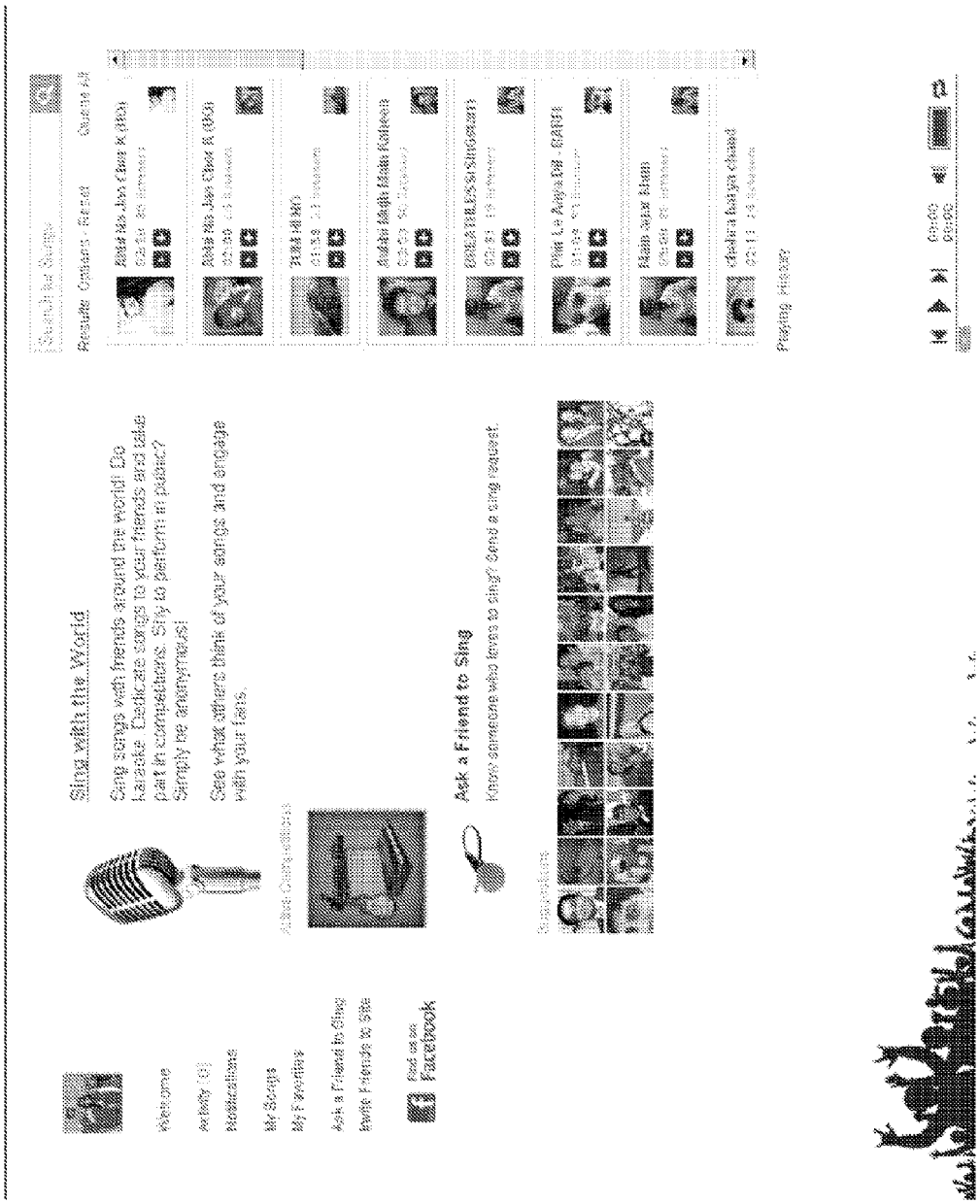
FIG. 6A-6E depict embodiments of screenshots of an interface provided by the system for creating an audio composition including at least one user recorded audio layer
Figure 6B:
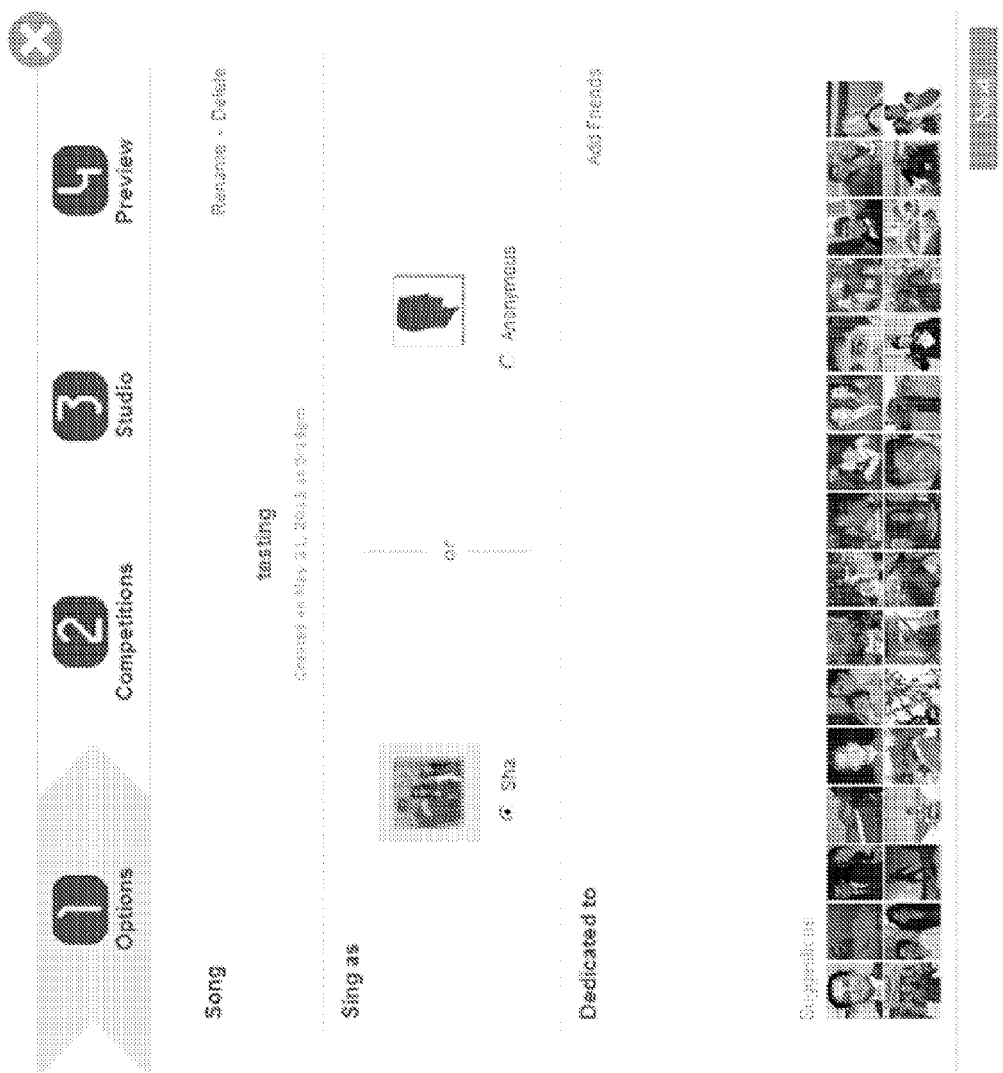
Figure 6C:
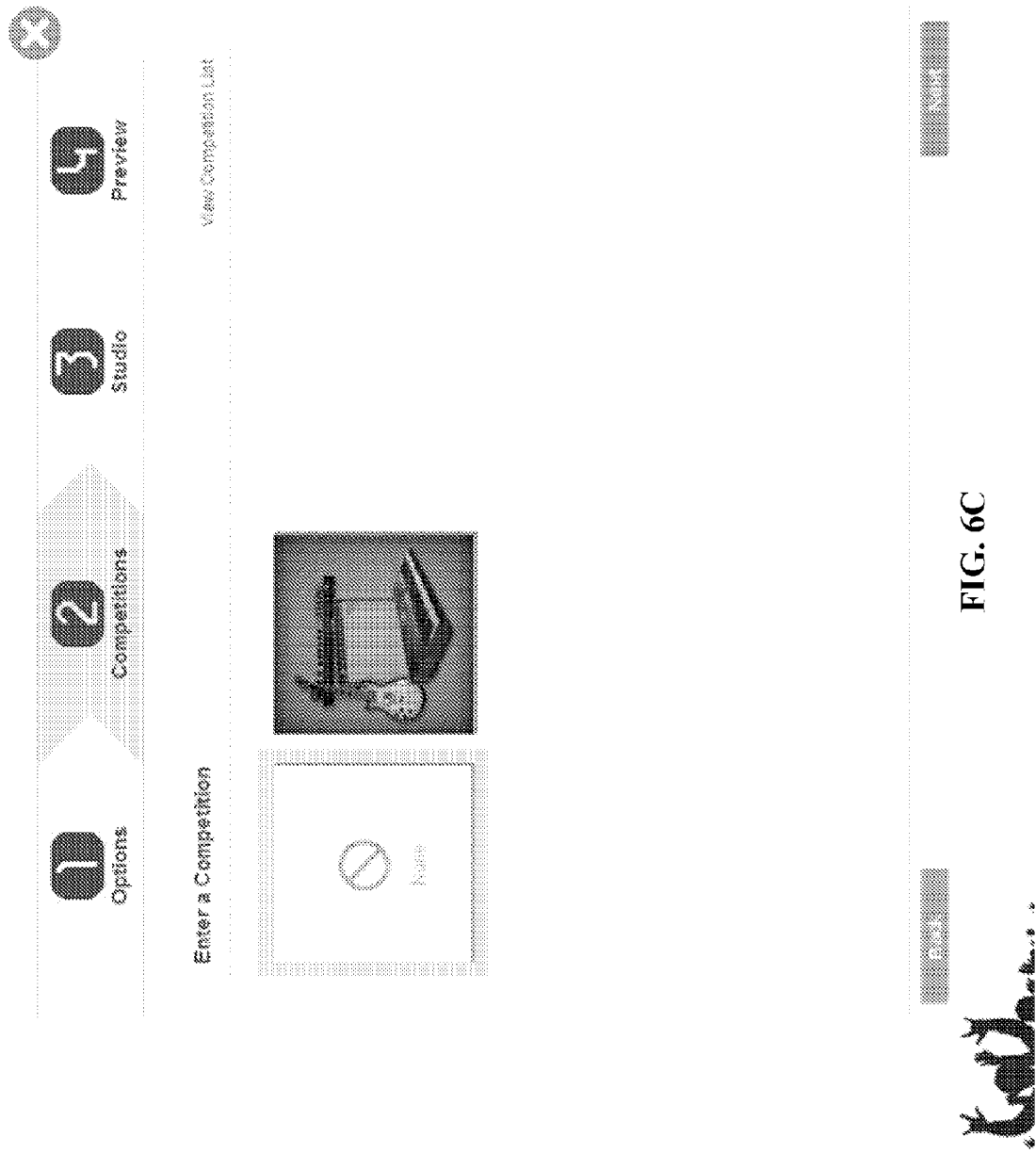
Figure 6D:
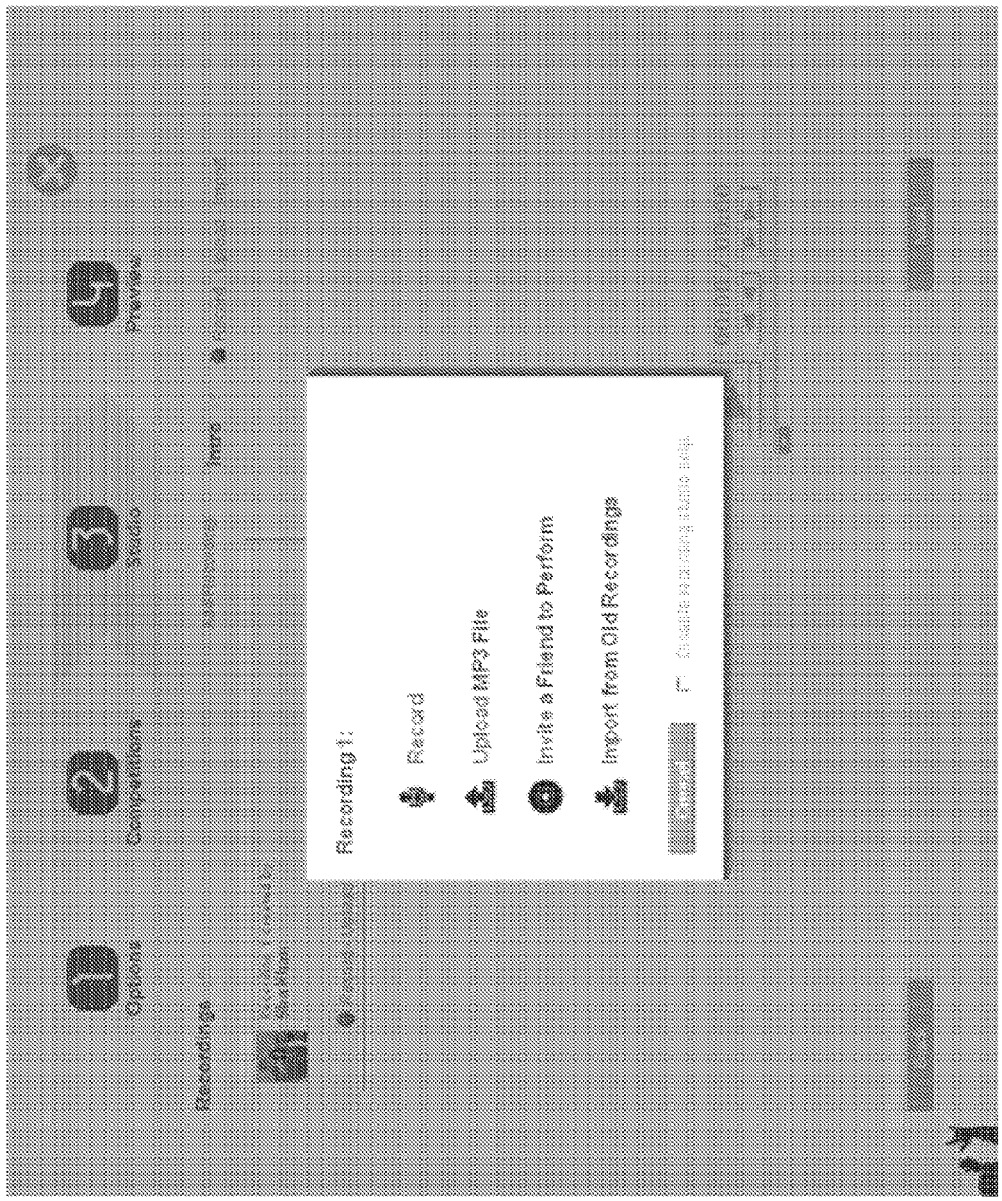
Figure 6E:
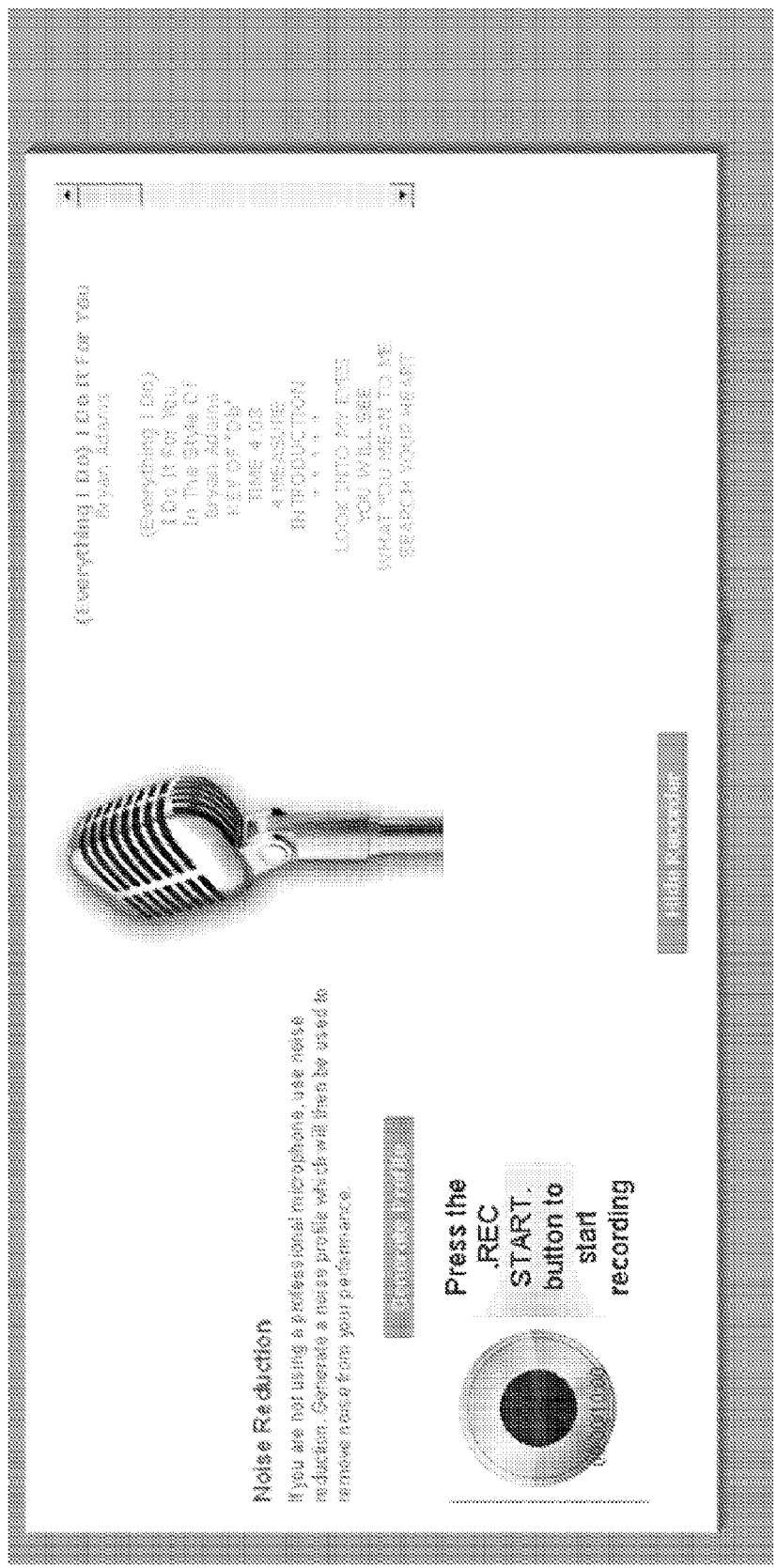
Figure 7A:
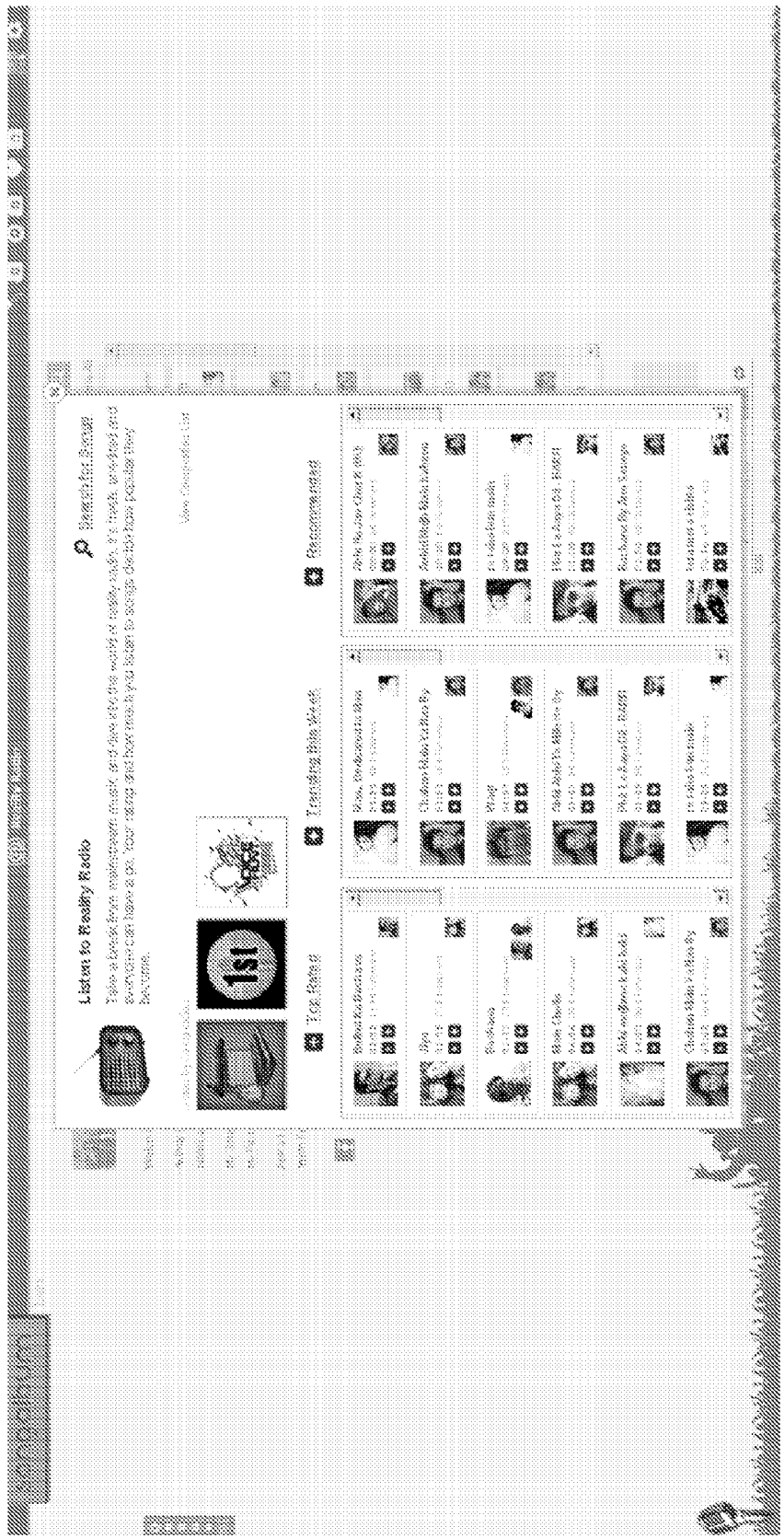
FIG. 7A-7D depict embodiments of screenshots of an interface providing various features.
Figure 7B:
Figure 7C:
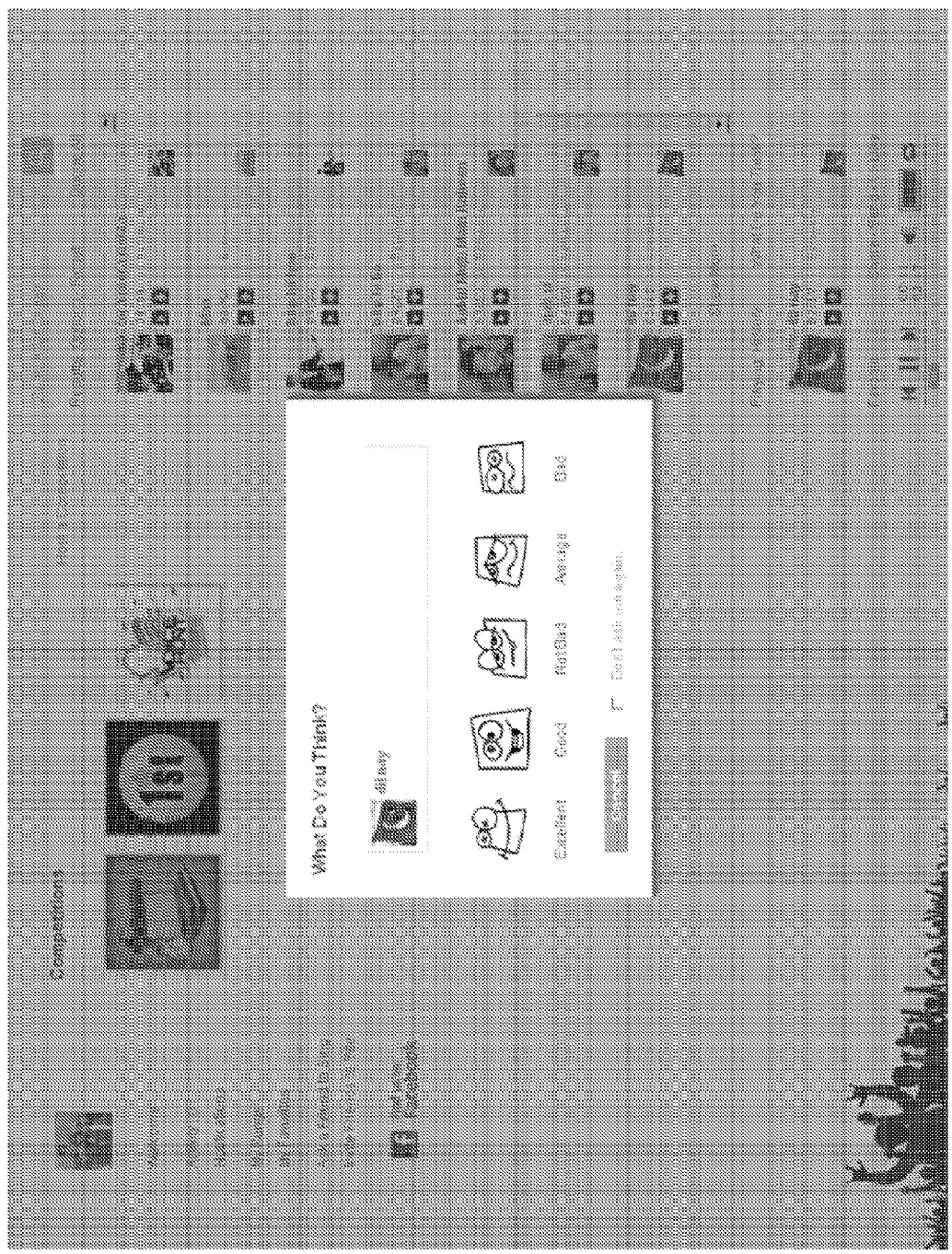
Figure 7D:
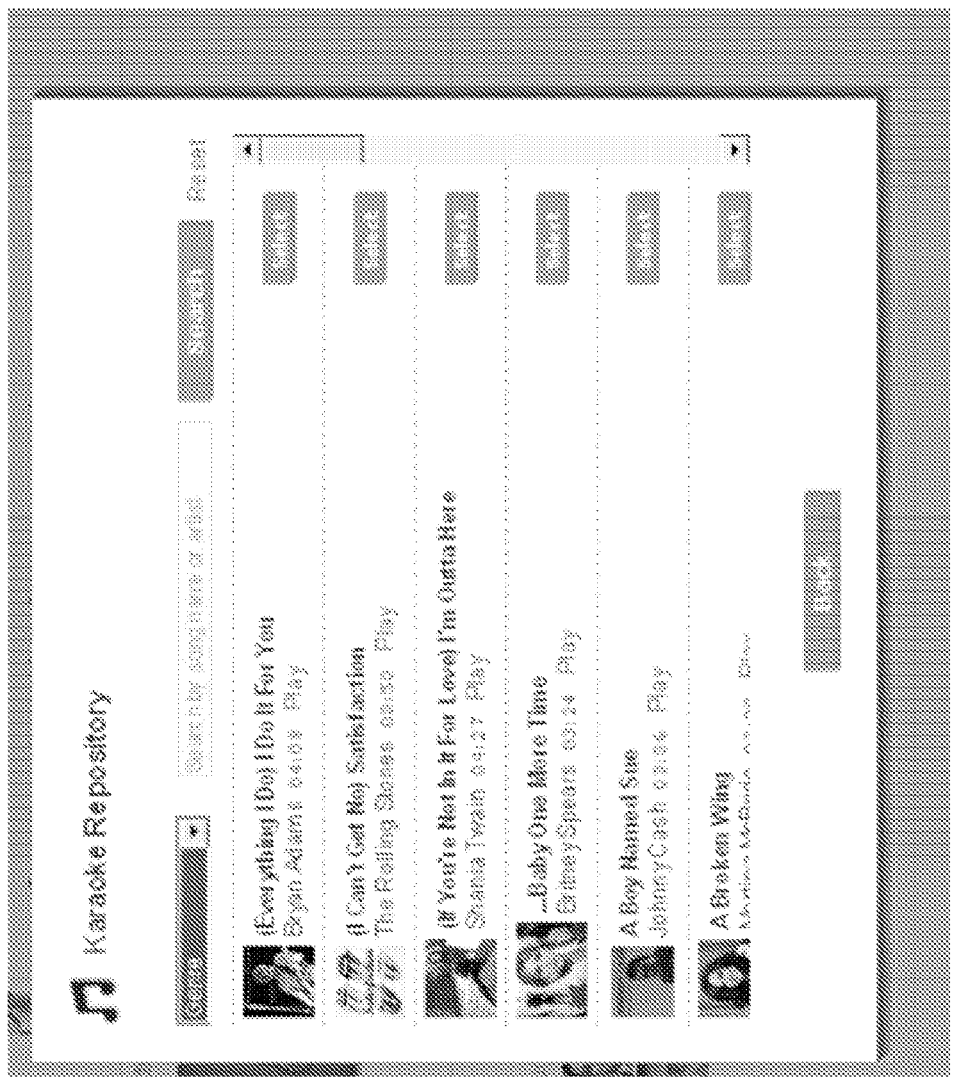

FIG. 5 depicts one embodiment of a method for synchronizing audio layers received from one or more computing devices. In brief overview, the audio synchronization system receives a first audio layer having a first length (Block 505). The audio synchronization system identifies a portion of a second audio layer with which the first audio layer is to be synchronized (Block 510). The audio synchronization system adjusts the first length to match a second length of the identified portion of the second audio layer (Block 515). The audio synchronization system trims a recording signal delay from a beginning portion of the adjusted first audio layer (Block 520). The audio synchronization system then combines the trimmed first audio layer and the second audio layer (Block 525).

In further detail, the audio synchronization system receives a first audio layer having a first length (Block 505). In some implementations, the audio synchronization system can provide a user interface at a user computing device through which a user can provide the first audio layer. In some implementations, the first audio layer can be recorded on the user computing device. In some implementations, the first audio layer can be uploaded to a server of the audio synchronization system. In some implementations, the first audio layer can be extracted from an existing audio file. In some implementations, a user may record the first audio layer. In some such implementations, the user may record the first audio layer while listening to a background layer. In some implementations, the user may begin recording the first audio layer upon selecting a record icon. The user may end the recording by selecting the record icon again. In some implementations, the user may record the first audio layer from a beginning portion of the background layer. In some implementations, the user may record the first audio layer from a portion of the background layer that is not the beginning of the background layer. For example, the user may select to play the background layer, and then after a first duration, select the record icon to record the first audio layer. The time corresponding to the background layer at which the user selects the record icon is stored as the start time at which the first audio layer is to be synchronized with the background layer. The user can then end the recording and the time corresponding to the background layer at which the user ends the recording is stored as the end time. The portion of the background layer with which the first audio layer is to be synchronized is the portion of the background layer that starts at the stored start time and ends at the stored end time. In some implementations, the user computing device can encode the first audio layer as an audio file. The user computing device can then transmit the audio file to the audio synchronization system. In some implementations, the user, via the user computing device, can send instructions to synchronize the audio file with the background layer. In some implementations, the instructions can indicate the portion of the background layer with which to synchronize the audio file. As such, the user computing device can also transmit the start time and the end time that corresponds to the portion of the background layer with which to synchronize the first audio layer. In some implementations, the user computing device can begin recording the first audio layer from a beginning of the background layer. In some implementations, the start time corresponds to the beginning time of the background layer, which can be 0 seconds. The first audio layer that is received by the audio synchronization system can have a first length. The first length can be approximately the duration between the time the user started the recording and ended the recorded. Due to system artifacts when encoding the audio layer, the user computing device can transmit the audio file having a length that differs from the duration. In some implementations, the audio synchronization system can identify the length of the first audio layer based on the length of the audio file corresponding to the first audio layer.

The audio synchronization system identifies a portion of a second audio layer with which the first audio layer is to be synchronized (Block 510). As described above, the audio synchronization system can identify the portion of the second audio layer with which the first audio layer is to be synchronized. The audio synchronization system can identify the portion of the second audio layer or background layer from the start time and end time provided by the user computing device. The portion of the background layer can have a second length that differs from the first length of the first audio layer that is provided to the audio synchronization system. As described above, this difference can be due to errors introduced when the user computing device encodes the first audio layer.

The audio synchronization system adjusts the first length to match a second length of the identified portion of the second audio layer (Block 515). The audio synchronization system can be configured to identify the difference in the first length and the second length and adjust the first length to match the second length. Upon adjusting the first length to match the second length, the audio synchronization system can be configured to apply a tempo effect to the first audio layer. To do so, the audio synchronization system can determine a ratio between the unadjusted first length and the second length. Upon determining the ratio, the audio synchronization system applies a tempo effect equivalent to the ratio to the first audio layer. In some implementations in which the first length is longer than the second length, the audio synchronization system can apply a tempo effect that increases the tempo of the first audio layer. Conversely, in implementations in which the first length is shorter than the second length, the audio synchronization system can apply a tempo effect that decreases the tempo of the first audio layer. In some implementations in which the first and second audio layers have the same length, no tempo effect needs to be applied as the ratio is 1.

The audio synchronization system trims a recording signal delay from a beginning portion of the adjusted first audio layer (Block 520). In some implementations, the recording signal delay can be a predetermined delay. In some implementations, the predetermined delay can be based on typical delays for particular types of computing devices. In some implementations, the audio synchronization system can select a recording signal delay based on the type and/or brand of user computing device. In some implementations, the audio synchronization system can receive a recording signal delay of the user computing device from the user computing device. In some implementations, the computing device can determine a recording signal delay of the user computing device. In some implementations, the audio synchronization system can run a recording signal delay determination test to determine the recording signal delay of the user computing device. In some implementations, the audio synchronization system can generate one or more audio pulses that are output from an audio output component, such as speakers, of the user computing device. An audio recording device, such as a microphone, of the user computing device can detect the audio pulses emitted from the audio recording device. In some implementations, the audio synchronization system can identify a first time at which the audio synchronization system sends a request to generate the audio pulse and identifies a second time at which the audio synchronization system identifies that the audio pulse is recorded by the audio recording device. In some implementations, the audio synchronization system can utilize an application that executes on the user computing device to determine the computing device recording delay.

Upon identifying the recording signal delay, the audio synchronization system can trim a beginning portion of the tempo-adjusted first audio layer by the identified recording signal delay. For instance, if the recording signal delay is 0.5 seconds, the adjusted first audio layer can be trimmed to remove the first 0.5 seconds of the tempo-adjusted first audio layer. By trimming the tempo-adjusted first audio layer, the length of the trimmed first audio layer and the length of the background layer or the length of the corresponding portion of the background layer with which to synchronize the first audio layer are no longer equal.

The audio synchronization system then combines the trimmed first audio layer and the second audio layer (Block 525). In some implementations, the trimmed first audio layer and the second audio layer are combined to form a synchronized audio composition. In some implementations, one or more additional layers received by the audio synchronization system can also be combined using the process described with respect to FIG. 5.

In some implementations, the audio synchronization system may be configured to provide users a platform that allows the users to create audio content that includes one or more audio layers that are automatically synchronized by the audio synchronization system. The users may interact with the audio synchronization system through an application that may include one or more features.

As described above, the audio synchronization system can be configured to provide a user interface through which one or more users can interact with the audio synchronization system. The audio synchronization system can be configured to present a user interface to a user via the user's computing device. A user can be configured to log in to a user account. The user account can be configured to maintain certain adjustable settings. The settings may include privacy settings that can hide or reveal the identity of the user to other users.

FIG. 6A-6E depict embodiments of screenshots of an interface provided by the system for creating an audio composition including at least one user recorded audio layer. In some implementations, the user interface can also provide a user the ability to create and publish a song. In some implementations, the user interface can be configured to guide the user through a three step process. Step 1 relates to creating a song profile. The song profile can include the name of the song, a title for the song that is provided by the user, a privacy setting of the song, and one or more other settings. The user can define the privacy setting of the song such that the publisher's name is published or remains anonymous. In addition, the song can also have its own privacy settings defined by the publisher such that only the publisher can access the song, one or more of the publisher's contacts can access the song or the song can be accessed by anyone.

The publisher can enter the song in one or more competitions. In some implementations, the publisher can select one or more competitions from a listing of ongoing competitions. In some implementations, the publisher can publish the song anonymously such that the identity of the publisher remains hidden. In some implementations, the publisher can dedicate the song to one or more users. In some implementations, the publisher can record an intro, which is appended to the beginning of the song. In this way, when the song is shared with others, others can listen to the publisher's intro before listening to the actual song itself. In some implementations, the publisher can add one or more effects to the intro.

Step 2 relates to the recording of one or more layers and the creation of the song. In some implementations, the user interface can be configured to allow a user to record one or more audio layers with a sing along layer or background layer. The background layer can be an instrumental version of the song the user is planning to sing. In some implementations, the user can select a sing along layer from a music repository. In some implementations, the music repository is stored on a server of the audio synchronization system. In some implementations, the music repository can be maintained by an external server, such as a server that stores online videos. In some implementations, the user can provide a link to media content that can include audio content. In some implementations, the audio synchronization system can be configured to access the media content and process the media content. In some implementations, processing the media content can include filtering one or more audio layers from the media content. In some implementations, the audio synchronization system can extract one or more audio layers, for example, one or more audio layers that correspond to an instrumental version of an audio track.

In some implementations, the audio synchronization system, via the user interface, is configured to receive a request from a user to start recording an audio layer. In some implementations, the instructions are received responsive to a user clicking on a record icon. In response to receiving the request, the audio synchronization system, via the user interface, can begin to output the background layer with which to synchronize the user recorded audio layer. In some implementations, the background layer is output via headphones coupled to the user computing device. In some implementations, the user can select at which point along the background layer the user would like to begin recording. In some implementations, the user interface can identify the time of the background layer at which the user clicks the record icon. After the user is done recording the layer, the user can click the record icon again to stop recording.

In some implementations, the audio synchronization system can be configured to present lyrics corresponding to the background layer being output. In some implementations, the lyrics are timed with the background layer to aid the user in singing along with the background layer.

In some implementations, the user may desire to sing only a portion of a song. As such, the user can trim the background layer of the song such that only the portion of the song that the user desires to sing is played when the user selects the record icon. In some implementations, the user interface can provide one or more tools for trimming the background layer. This trimming tool can be based on time.

In some implementations, the background layer that is played when the user records the user recorded audio layer can be combined with the user recorded audio layer. In some implementations, the user can, via the user interface, elect to not combine the background layer with the user recorded audio layer.

In some implementations, the user can modify the background layer to include one or more effects. For example, the user can add an echo, reverb, a delay, a decay, amongst other types of effects. In some implementations, the user can alter one or more characteristics of the signal, such as the tempo, pitch, volume, amongst others. In addition, the user can apply one or more filters, for example, apply a center cut filter to reduce the volume of vocals existing in the background layer.

Once the user has recorded one or more user recorded audio layers, the user can submit the one or more layers for processing. In some implementations, the processing includes synchronizing one or more of the user recorded audio layers with each other or with one or more background layers. As described above, the audio synchronization system can then synchronize the one or more layers to form an audio composition.

FIG. 7A-7D depict embodiments of screenshots of an interface providing various features. In some implementations, the user interface can be configured to display one or more notifications. In some implementations, the notifications are displayed on a header of the user interface. Examples of notifications can include a performance request. A performance request is a request for the user to record an audio layer of a particular audio composition. In some implementations, the performance request can be a request to sing a song, to play an instrument for a song, or to add additional audio layers to a song. Another example notification can be a song dedication. A song dedication notifies the user that the user has been dedicated a song. In some implementations, a user that records a song can dedicate the song to one or more other users. In some implementations, a user that has access to a song can dedicate the song to one or more other users. In some implementations, the song dedication can include an object that corresponds to the song being dedicated as well as a personal message.

In some implementations, the audio synchronization system can be configured to store one or more songs in containers that include additional information about the songs. In addition, when the audio synchronization system presents a song on the user interface, the audio synchronization system can be configured to present additional information related to the song along with song itself. The song can be presented on the user interface as an object, such as an icon, a link, or other graphical object. The container in which the song is stored can include additional information that can also be displayed with the song object. Examples of the information that can be displayed with the song object include one or more of a picture associated with the user that publishes the song, a name of the song, a duration of the song, a flag indicating if the song contains material not suitable for certain types of people, for example, an adult flag indicating the song is rated R, one or more links to play the song, add the song to a queue, share the song, or add the song to favorites, and one or more pictures associated with one or more users that recorded audio layers of the song. In some implementations, other information that can be displayed with the song include a number of times the song has been played, shared, added to a playlist, a rating, a language in which the song is performed, a geographic region in which the song is performed, amongst others.

In some implementations, the audio synchronization system can be configured to store being dedicated as well as a personal message. In some implementations, one or more users can search for songs by publisher, artist, or name. In some implementations, search results can be filtered by competitions for which the songs were entered, by friends of the user, or by friends of the user associated with one or more other social networking sites, for example, www.facebook.com. Songs can also be filtered by language, adult ratings, ratings, durations, types of instruments used, number of singers, amongst others. In some implementations, the publisher of the song can be configured to provide such information to the audio synchronization system when requesting to publish the song. This information can be stored in the container associated with the song. The information can be part of the profile of the song or the container. In some implementations, the publisher can update the profile of the song after the song is published.

In some implementations, the user interface can provide an audio player configured to play songs. The player can identify a song currently being played and provide one or more links for adding songs to a queue or adding a song as a favorite. In addition, additional links can be provided for receiving a user rating. In some implementations, the player can be configured to play one or more audio ads before, during or after playing one or more songs. When an ad is being played, a visual object may be presented to the user through which the user can get additional information associated with the ad. In some implementations, the visual object can be a banner ad. The audio player can be configured to include one or more controls to stop, play, pause, rewind, forward a song or skip to another song.

In some implementations, the user interface can also provide an object through which a user can view songs associated with the user. In some implementations, the object can be a link to a web page. The web page associated with the object can include all songs published by the user, all unpublished songs created by the user, all published songs with performances of the users, as well as unpublished songs for which the user has been granted authority to access. Examples of such unpublished songs can includes songs for which the user has been requested to provide an audio layer, such as to add an audio layer in which the user sings a song or plays an instrument, amongst others.

In some implementations, the user interface can also provide a song activity section. In this section, activity related to songs published by the user is shown. The activity stream can include entries indicating that a person has accessed a song published by the user. Accessing a song can include listening to the song, providing a rating to the song, sharing the song, commenting on the song, or any other activity associated with the song. The entries can include a time stamp, an identity, such as a name or picture, of the person if the person's privacy settings allow for it, .the name of the song and a link to the person's profile page.

Figure 8:
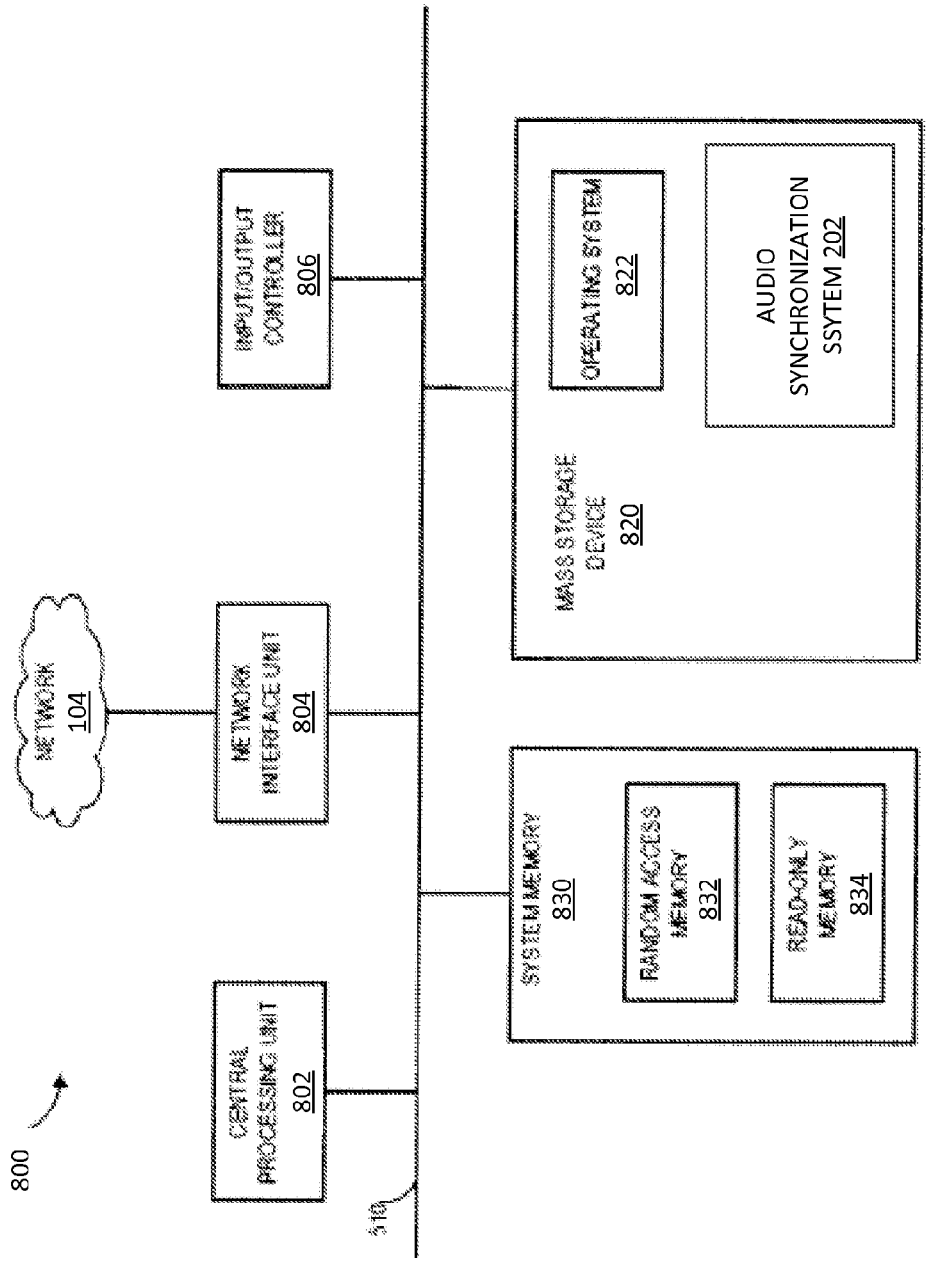
FIG. 8 is a computer architecture diagram illustrating computing system hardware capable of automatically synchronizing audio layers recorded on multiple devices.

FIG. 8 is a computer architecture diagram illustrating computing system hardware capable of automatically synchronizing multiple audio layers recorded on multiple devices according to one or more embodiments presented herein. The computer architecture illustrated in FIG. 8 can include a central processing unit 802 (CPU), a system memory 830, including a random access memory 832 (RAM) and a read-only memory 834 (ROM), and a system bus 510 that can couple the system memory 830 to the CPU 802. A basic input/output system containing the basic routines that help to transfer information between elements within the computer architecture 800, such as during startup, can be stored in the ROM 834. The computer architecture 800 may further include a mass storage device 820 for storing an operating system 822, software, data, and various program modules, such as the incentive rewards application 202.

The mass storage device 820 can be connected to the CPU 802 through a mass storage controller (not illustrated) connected to the bus 510. The mass storage device 820 and its associated computer-readable media can provide non-volatile storage for the computer architecture 800. Although the description of computer-readable media contained herein refers to a mass storage device, such as a hard disk or CD-ROM drive, it should be appreciated by those skilled in the art that computer-readable media can be any available computer storage media that can be accessed by the computer architecture 800.

By way of example, and not limitation, computer-readable media may include volatile and non-volatile, removable and non-removable media implemented in any method or technology for the non-transitory storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the computer architecture 800.

According to various embodiments, the computer architecture 800 may operate in a networked environment using logical connections to remote computers through a network such as the network 104. The computer architecture 800 may connect to the network 104 through a network interface unit 804 connected to the bus 510. It should be appreciated that the network interface unit 804 may also be utilized to connect to other types of networks and remote computer systems. The computer architecture 800 may also include an input/output controller 806 for receiving and processing input from a number of other devices, including a keyboard, mouse, or electronic stylus (not illustrated). Similarly, an input/output controller 806 may provide output to a video display, a printer, or other type of output device (also not illustrated).

As mentioned briefly above, a number of program modules and data files may be stored in the mass storage device 820 and RAM 832 of the computer architecture 800, including an operating system 822 suitable for controlling the operation of a networked desktop, laptop, server computer, or other computing environment. The mass storage device 820, ROM 834, and RAM 832 may also store one or more program modules.

In particular, the mass storage device 820, the ROM 834, and the RAM 832 may store audio synchronization system 202 for execution by the CPU 802. The audio synchronization system 202 can include software components for implementing portions of the processes discussed in detail with respect to FIGS. 2-7. The mass storage device 820, the ROM 834, and the RAM 832 may also store other types of program modules.

Software modules, such as the various modules within the audio synchronization system 202 may be associated with the system memory 830, the mass storage device 820, or otherwise. According to embodiments, the audio synchronization system 202 may be stored on the wireless communications network 100 and executed by a central computing device. In other embodiments, the audio synchronization system 202 may be stored on the network 104 and executed by any computer within the network 104.

The software modules may include software instructions that, when loaded into the CPU 802 and executed, transform a general-purpose computing system into a special-purpose computing system customized to facilitate all, or part of, automatic synchronization of multiple audio layers recorded on multiple devices techniques disclosed herein. As detailed throughout this description, the program modules may provide various tools or techniques by which the computer architecture 800 may participate within the overall systems or operating environments using the components, logic flows, and/or data structures discussed herein.

The CPU 802 may be constructed from any number of transistors or other circuit elements, which may individually or collectively assume any number of states. More specifically, the CPU 802 may operate as a state machine or finite-state machine. Such a machine may be transformed to a second machine, or specific machine by loading executable instructions contained within the program modules. These computer-executable instructions may transform the CPU 802 by specifying how the CPU 802 transitions between states, thereby transforming the transistors or other circuit elements constituting the CPU 802 from a first machine to a second machine, wherein the second machine may be specifically configured to automatically synchronize multiple audio layers recorded on multiple devices. The states of either machine may also be transformed by receiving input from one or more user input devices associated with the input/output controller 806, the network interface unit 804, other peripherals, other interfaces, or one or more users or other actors. Either machine may also transform states, or various physical characteristics of various output devices such as printers, speakers, video displays, or otherwise.

Encoding of the program modules may also transform the physical structure of the storage media. The specific transformation of physical structure may depend on various factors, in different implementations of this description. Examples of such factors may include, but are not limited to: the technology used to implement the storage media, whether the storage media are characterized as primary or secondary storage, and the like. For example, if the storage media are implemented as semiconductor-based memory, the program modules may transform the physical state of the system memory 830 when the software is encoded therein. For example, the software may transform the state of transistors, capacitors, or other discrete circuit elements constituting the system memory 830.

As another example, the storage media may be implemented using magnetic or optical technology. In such implementations, the program modules may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. It should be appreciated that various other transformations of physical media are possible without departing from the scope and spirit of the present description.

Based on the foregoing, it should be appreciated that technologies for automatically synchronizing multiple audio layers recorded on multiple devices are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementation.

The subject matter described above is provided by way of illustration only and should not be construed as limiting. Various modifications and changes may be made to the subject matter described herein without following the example embodiments and applications illustrated and described, and without departing from the true spirit and scope of the present invention.

What is claimed is:

1. A method of synchronizing audio layers to form an audio composition, comprising:
   receiving, from a first computing device, at an audio synchronization system, a first audio layer having a first length;
   identifying, by the audio synchronization system, a portion of a second audio layer with which the received first audio layer is to be synchronized;
   adjusting, by the audio synchronization system, the first length to match a second length of the identified portion of the second audio layer by altering the tempo of the first audio layer based on a ratio of the first length to the second length;
   trimming, by the audio synchronization system, a recording signal delay of a first computing device from a beginning portion of the first audio layer, the recording signal delay corresponding to a processing performance of the first computing device; and
   combining the first audio layer and the second audio layer to form the audio composition.

2. The method of claim 1, wherein altering a tempo of the first audio layer based on a ratio of the first length to the second length, comprises calculating the ratio of the first length to the second length.

3. The method of claim 1, wherein the first audio layer is received from a first computing device and the second audio layer is received from a second computing device.

4. The method of claim 1, wherein the first computing device is one of a personal computer and a mobile device.

5. The method of claim 1, wherein the second audio layer includes a reference audio layer.

6. The method of claim 1, wherein the second audio layer includes a user recorded audio layer.

7. The method of claim 1, wherein the recording signal delay is a predetermined time delay.

8. The method of claim 1, further comprising determining a recording signal delay of the first computing device.

9. The method of claim 8, wherein determining the recording signal delay of the first computing device comprises:
   generating a plurality of audio pulses at the first computing device;
   receiving, from an audio input device coupled to the first computing device, a plurality of recordings corresponding to the generated plurality of audio pulses;
   determining an average time between receiving the generated plurality of audio pulses and generating the plurality of audio pulses; and
   identifying the average time as the recording signal delay of the first computing device.

10. An audio synchronization system, comprising:
    a memory;
    a processor coupled to the memory, the processor configured to
      receive, from a first computing device, a first audio layer having a first length;
      identify a portion of a second audio layer with which the received first audio layer is to be synchronized;
      adjust the first length to match a second length of the portion of the second audio layer by altering the tempo of the first audio layer based on a ratio of the first length to the second length;
      trim a recording signal delay of a first computing device from a beginning portion of the first audio layer, the recording signal delay corresponding to a processing performance of the first computing device; and
      combine the first audio layer and the portion of the second audio layer to form the audio composition.

11. The system of claim 10, wherein the processor is further configured to calculate the ratio of the first length to the second length.

12. The system of claim 10, wherein the first audio layer is received from a first computing device and the second audio layer is received from a second computing device.

13. The system of claim 10, wherein the first computing device is one of a personal computer and a mobile device.

14. The system of claim 10, wherein the second audio layer includes a reference audio layer.

15. The system of claim 10, wherein the second audio layer includes a user recorded audio layer.

16. The system of claim 10, wherein the recording signal delay is a predetermined time delay.

17. The system of claim 10, further the processor is configured to determine a recording signal delay of the first computing device.

18. The system of claim 17, wherein the processor is configured to
    generate a plurality of audio pulses at the first computing device;
    receive, from an audio input device coupled to the first computing device, a plurality of recordings corresponding to the generated plurality of audio pulses;
    determine an average time between receiving the generated plurality of audio pulses and generating the plurality of audio pulses; and
    identify the average time as the recording signal delay of the first computing device.

19. A non-transitory computer-readable storage medium having computer-executable instructions stored thereon, which when executed by a processor, causes the processor to:
    receive, from a first computing device, a first audio layer having a first length;
    identify a portion of a second audio layer with which the received first audio layer is to be synchronized;
    adjust the first length to match a second length of the identified portion of the second audio layer by altering the tempo of the first audio layer based on a ratio of the first length to the second length;

trim a recording signal delay of a first computing device from a beginning portion of the first audio layer, the recording signal delay corresponding to a processing performance of the first computing device; and combine the first audio layer and the second audio layer to form the audio composition.

20. The non-transitory computer-readable storage medium of claim 19, wherein altering a tempo of the first audio layer comprises calculating the ratio of the first length to the second length.

* * * * *